United States Patent Office 3,434,118
Patented Mar. 18, 1969

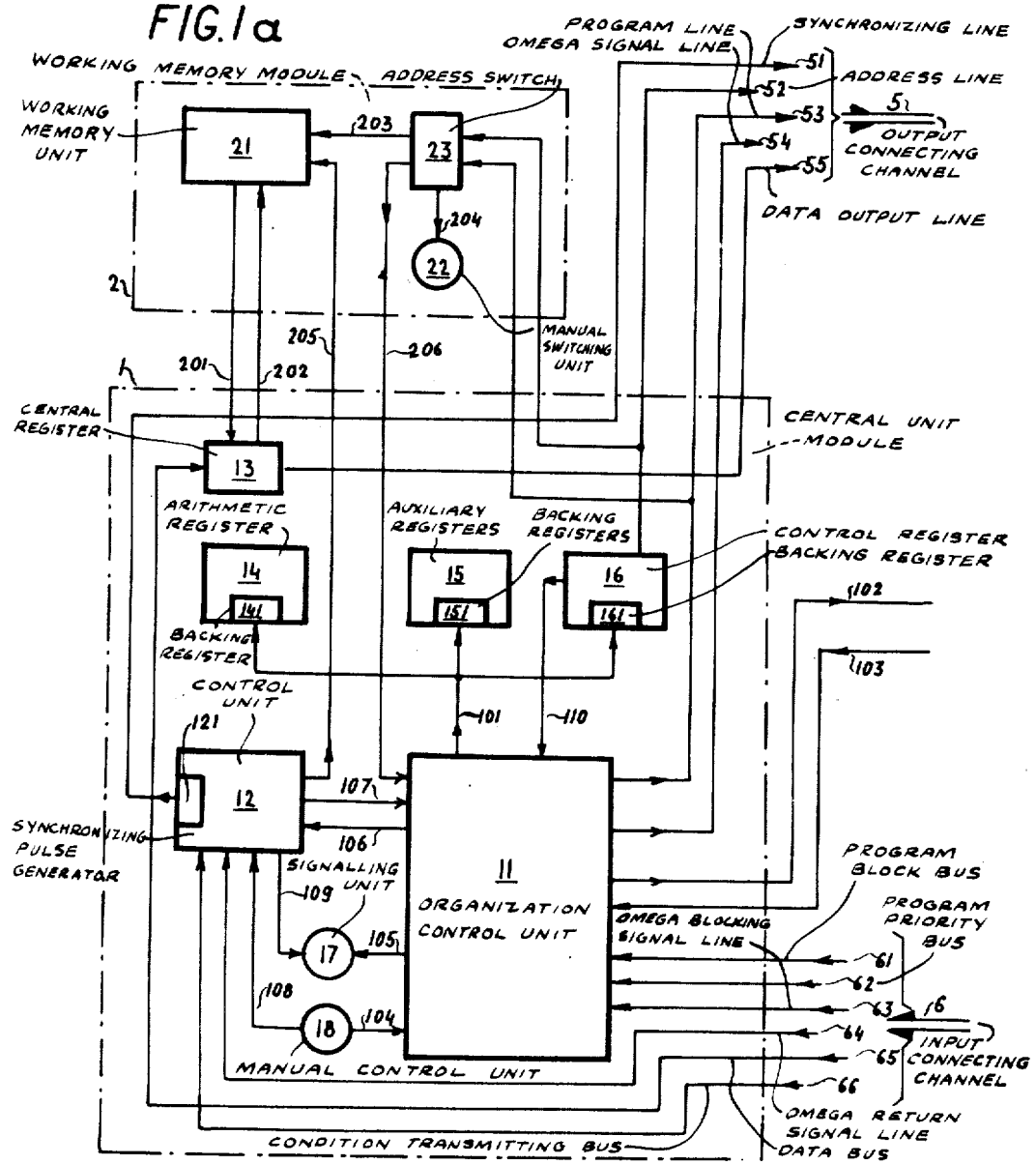

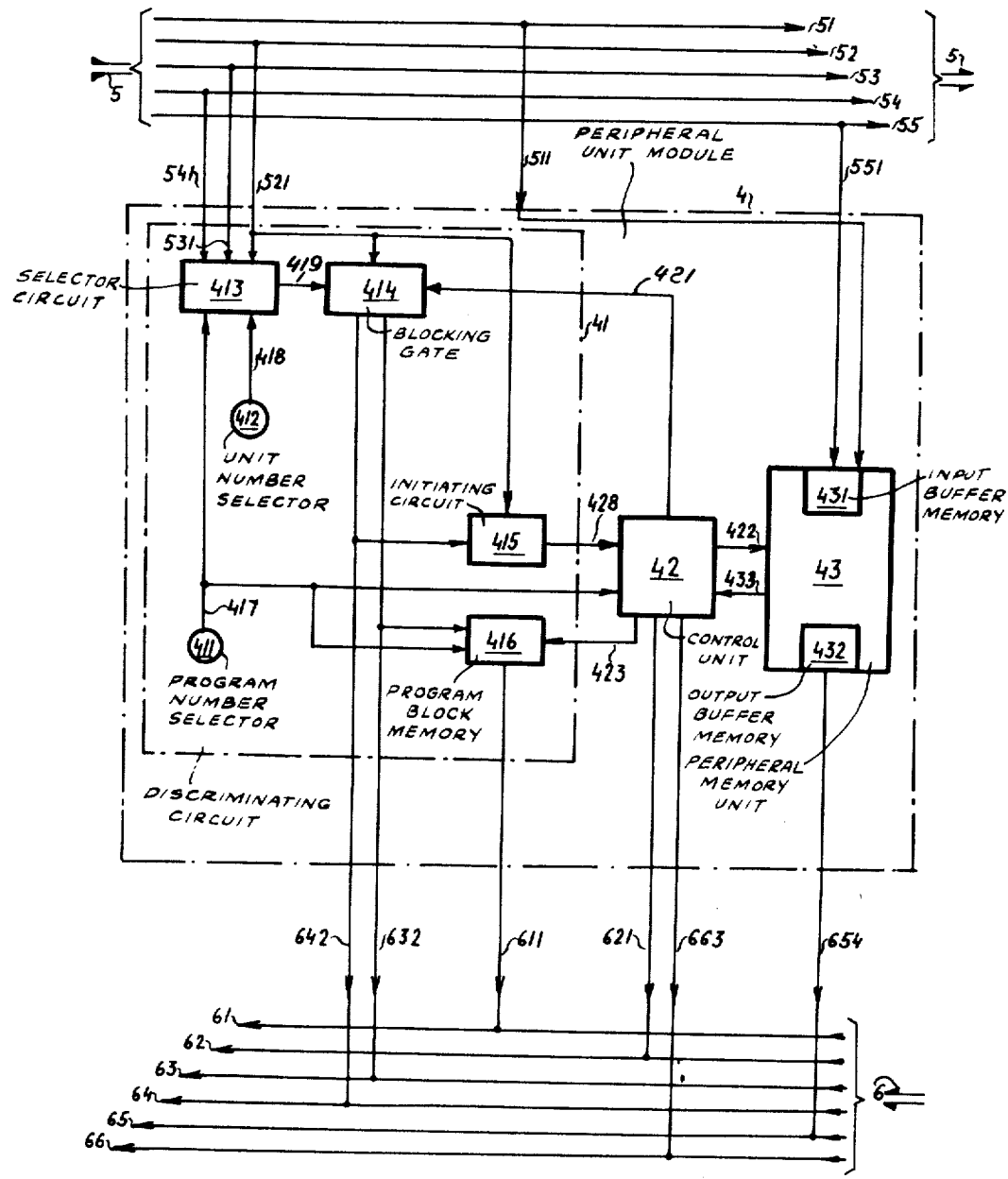

3,434,118
MODULAR DATA PROCESSING SYSTEM
Antonín Svoboda, Jan Oblonský and Zdeněk Korvas, Prague, Czechoslovakia, assignors to Výzkumný ústav matematických strojů, Prague, Czechoslovakia
Filed May 1, 1964, Ser. No. 364,206
U.S. Cl. 340—172.5                 23 Claims
Int. Cl. G11b *13/00;* G06f *1/00*

ABSTRACT OF THE DISCLOSURE

A modular data processing system comprises central apparatus which includes organization control equipment and further comprises a working memory, an auxiliary memory and peripheral apparatus. Each auxiliary memory and each peripheral apparatus includes a discriminating circuit. Output connecting channels connect the central apparatus in common to the auxiliary memory and the peripheral apparatus and include a program line connected between the organization control equipment and the discriminating circuit of each of the auxiliary memories and each of the peripheral apparatus for transmitting to each of the discriminating circuits a signal indicating to which of a plurality of independent programs a selected instruction relates. Input connecting channels connect the auxiliary memories and the peripheral apparatus in common to the central apparatus.

---

The present invention relates to a modular data processing system and concerns more specifically a system of said type intended for dealing with a number of problems in parallel, according to programs which are independent of one another. The system which forms the subject matter of the present invention comprises a central unit module, a working memory module, an auxiliary memory module and a number of peripheral unit modules.

The central unit module comprises substantially an automatic digital computer controlled by a program, stored in the working memory module, for example. The other modules may comprise, for instance, high capacity auxiliary memories, magnetic tape memories, punched card or punched tape operated input and output units, printers, particularly high speed printers, further analog-digital and digital-analog converters as used in connection with controlled manufacturing and similar processes. The number and type of the other modules is almost unlimited, which feature represents a considerable advantage of the new system.

The invention has for its object to provide a construction which is more efficient in use than those heretofore proposed.

According to the main feature of the invention the various peripheral unit modules and the auxiliary memory module are connected to the central unit module on the one hand by means of one input connecting channel, common to all unit modules, and, on the other hand, by means of one output connecting channel, likewise common to all unit modules, said output connecting channel comprising a program bus, leading from an organisation control unit, forming part of the central unit module, to discriminating circuits of the auxiliary memory module and all peripheral unit modules. The program bus is adapted to transmit a signal indicating to which of the independent programs the instruction to be effected at a given moment, is related.

In order that the invention may be clearly understood and readily carried into effect, the same will now be described with reference to and by aid of the accompanying drawings, showing diagrammatically an exemplary embodiment of the invention.

Figure 1B:
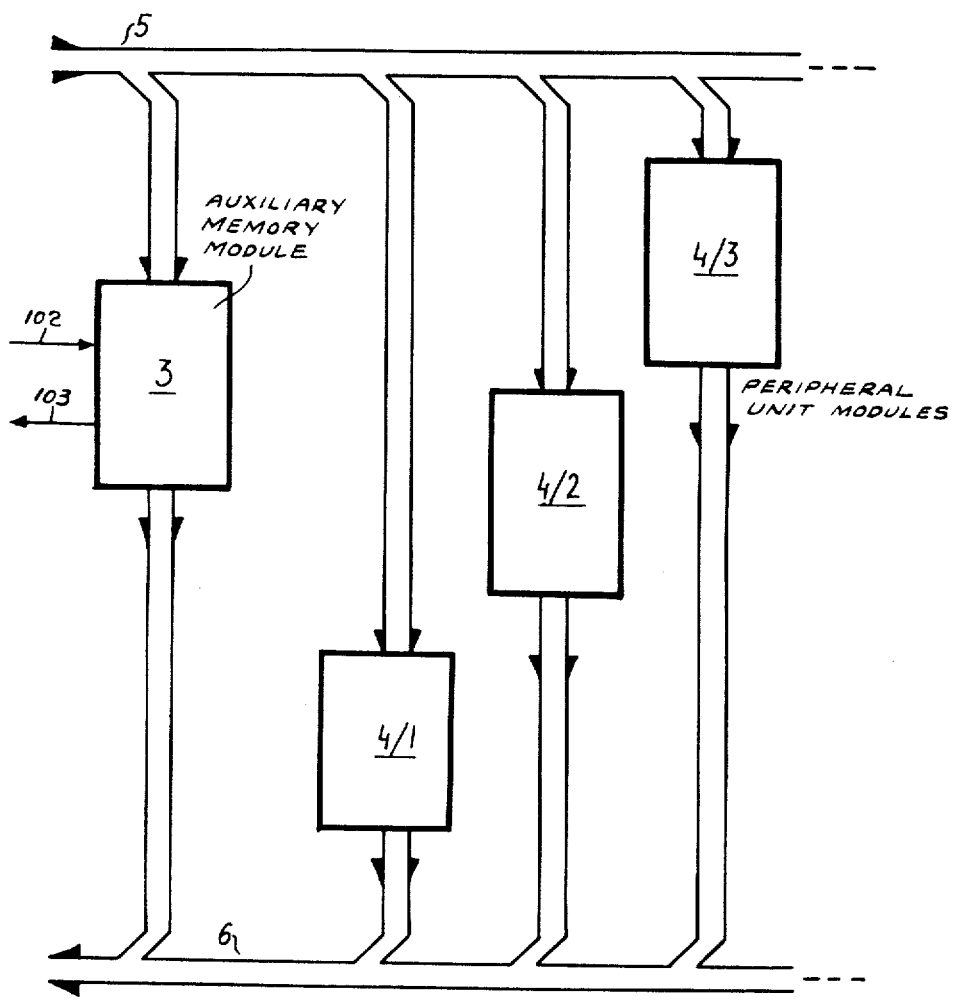
Figure 3:
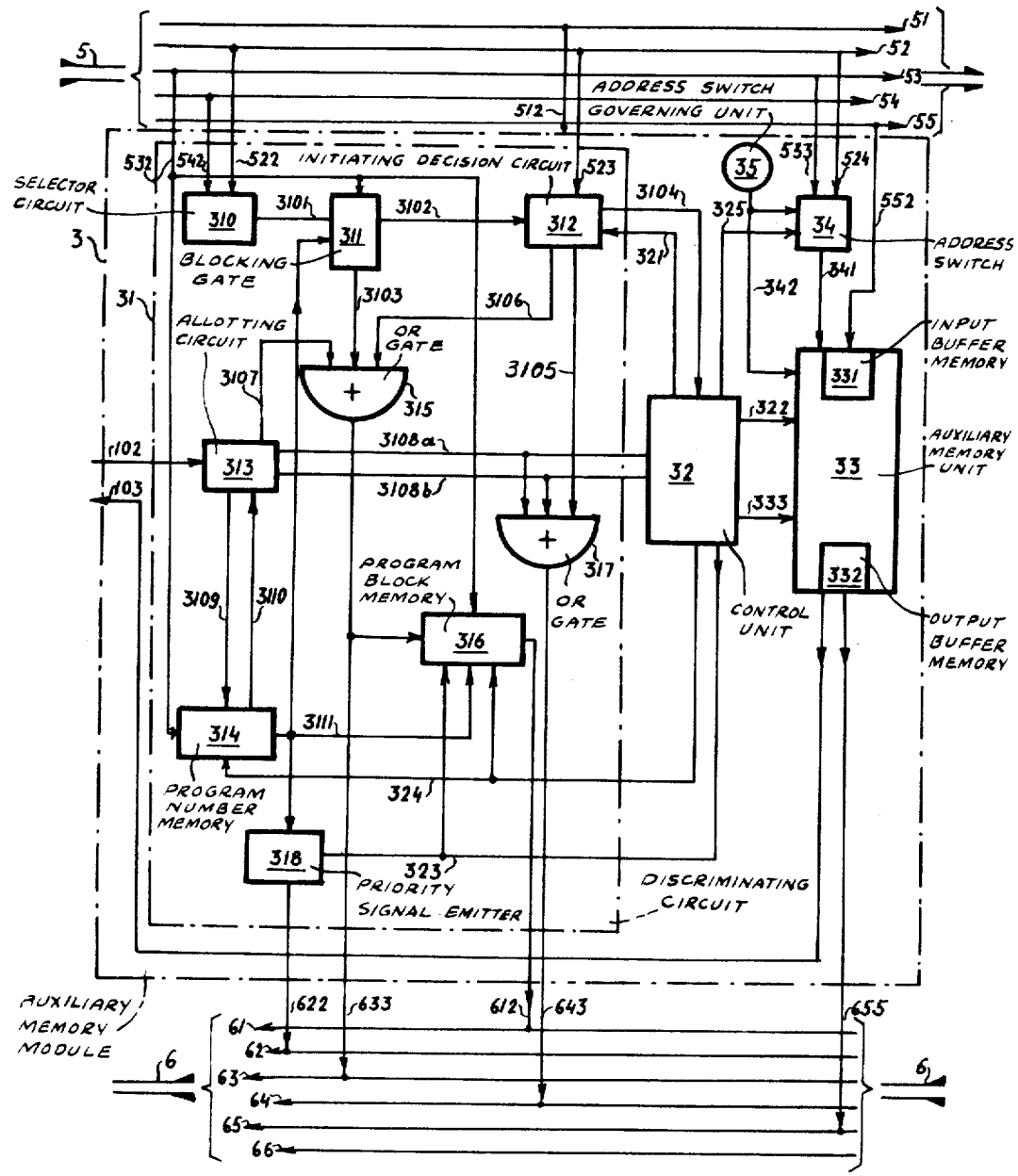
Figure 4:
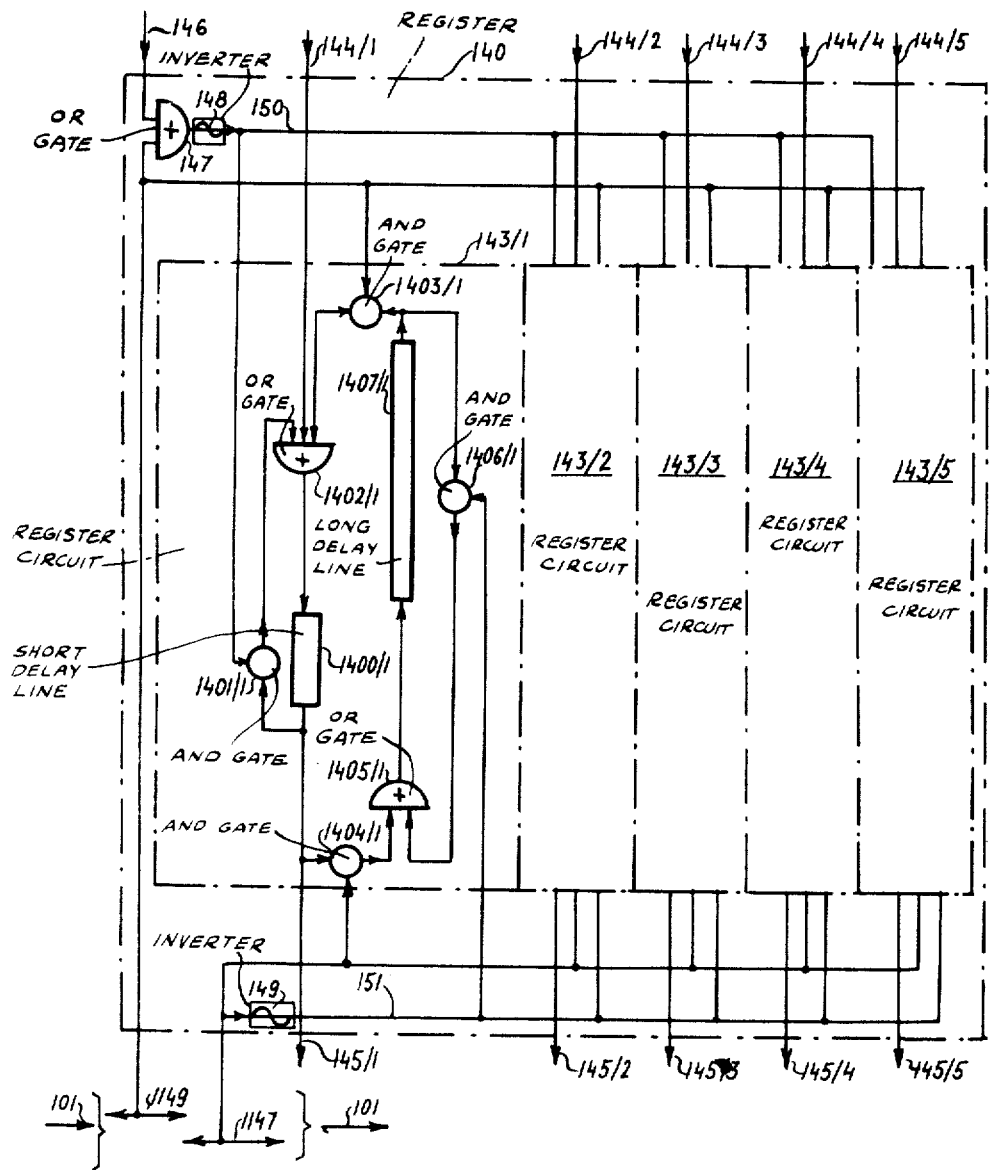
Figure 5:
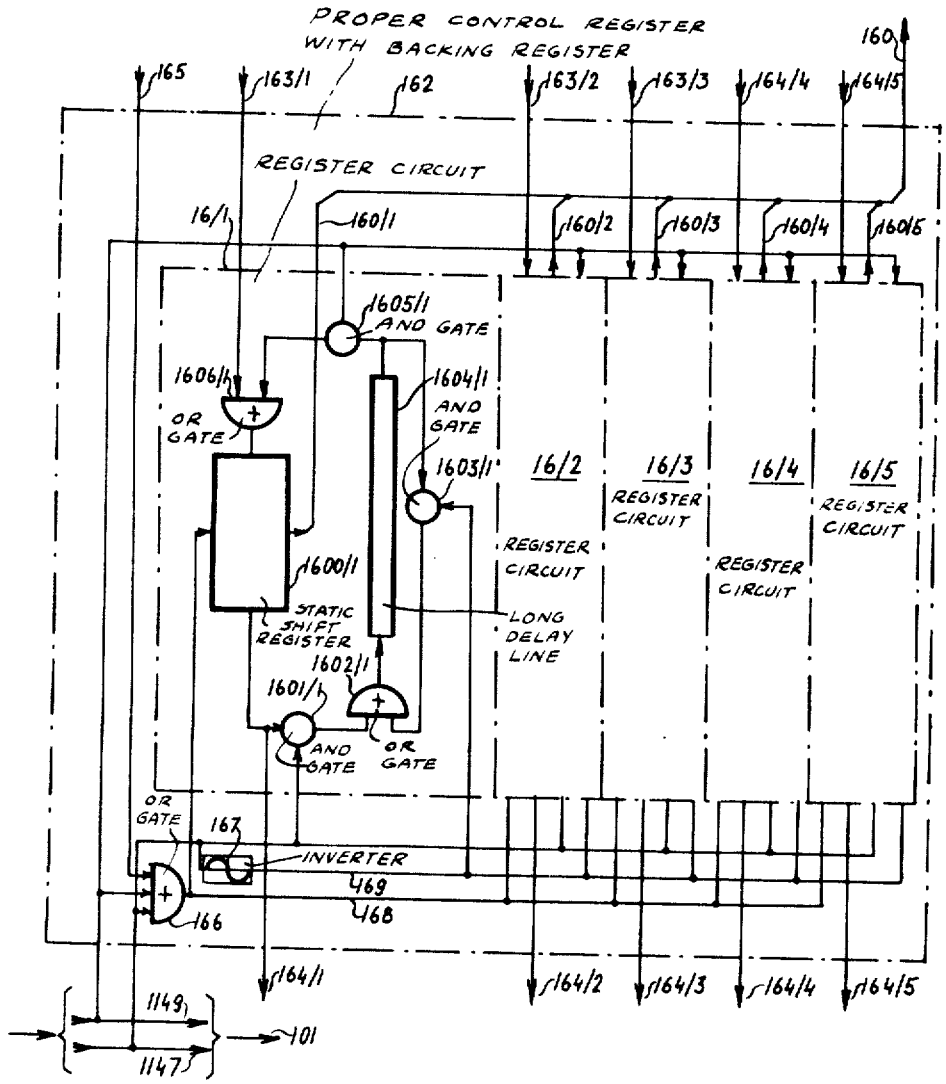
Figure 6:
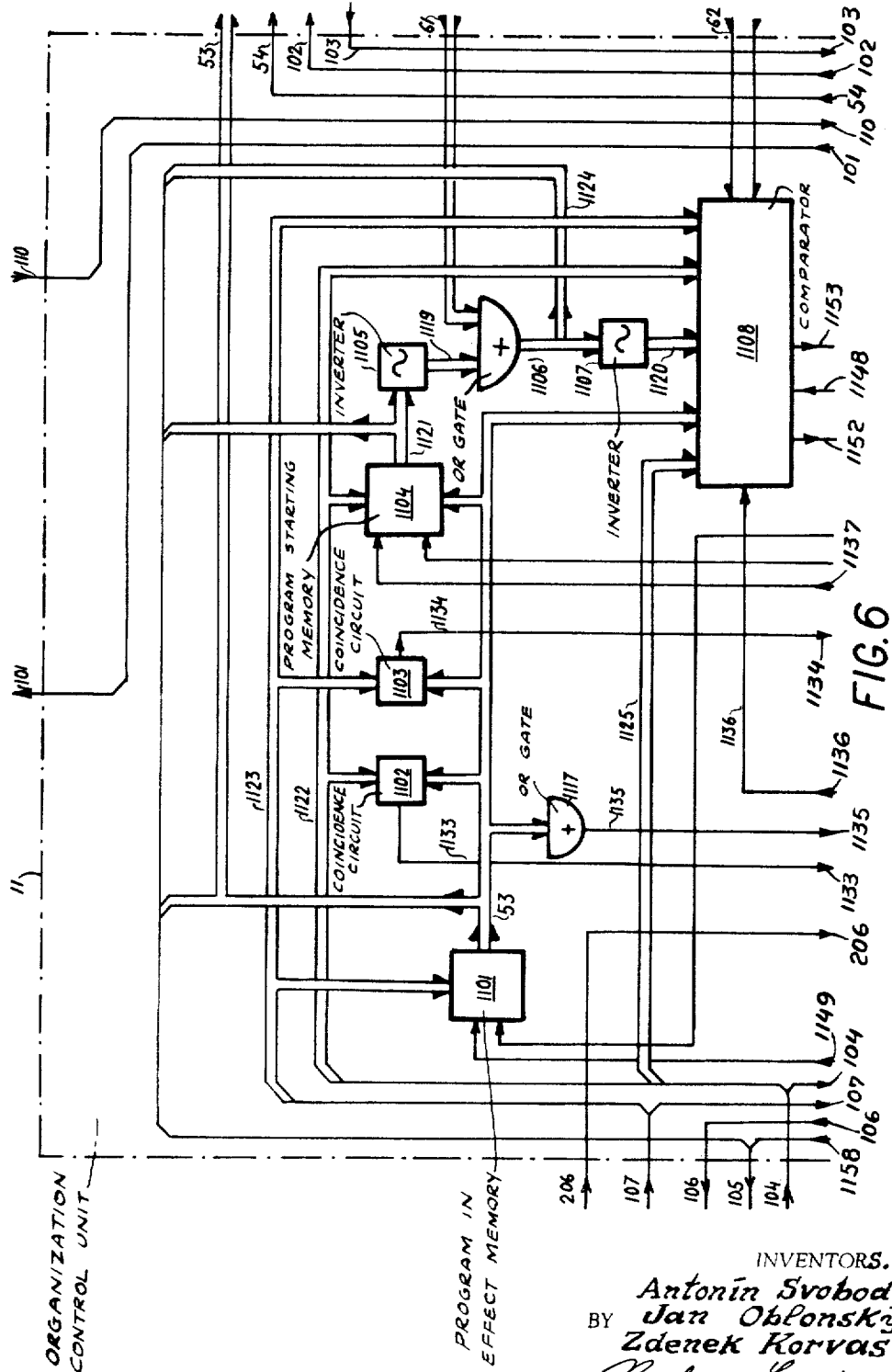
Figure 7:
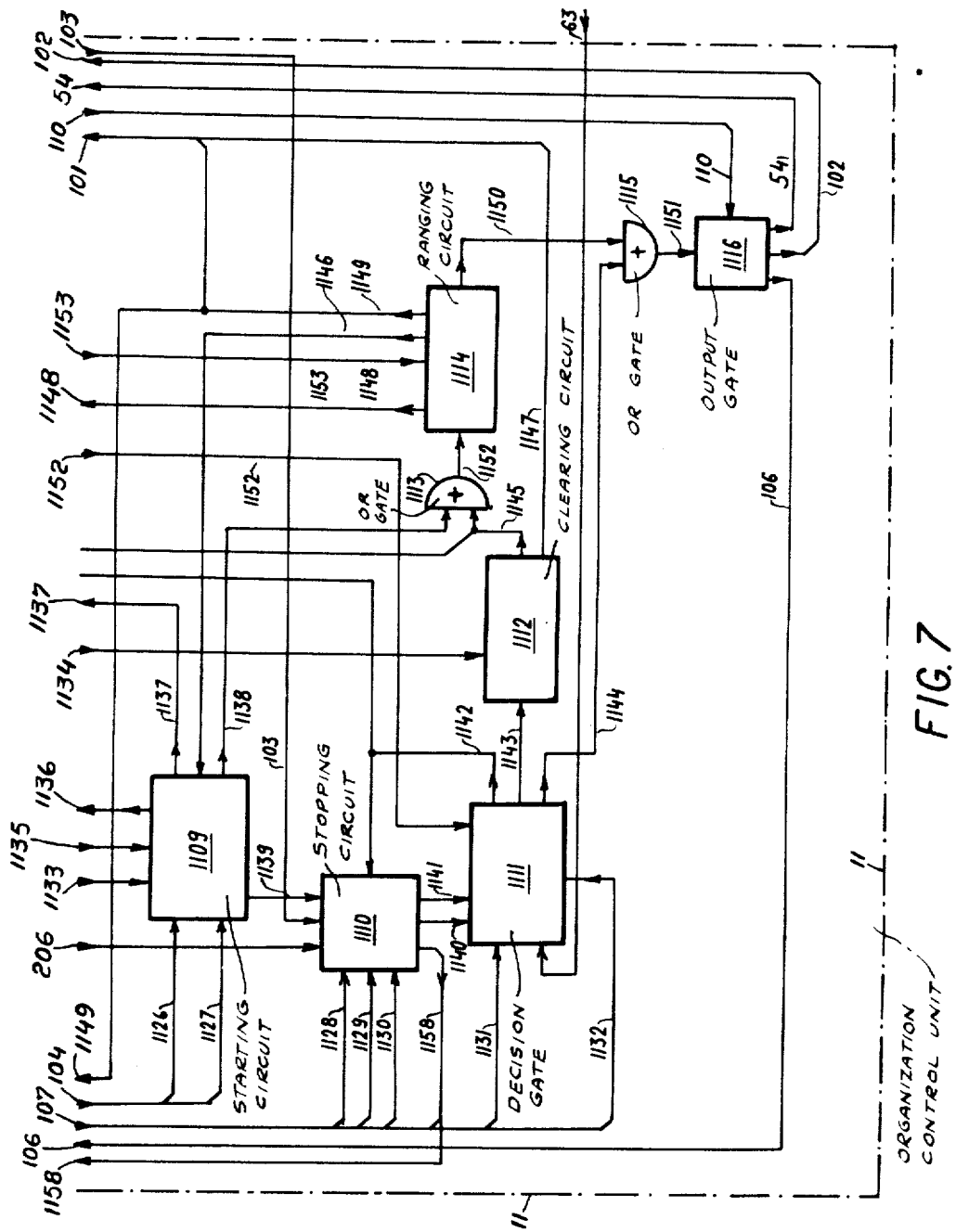
Figure 8:
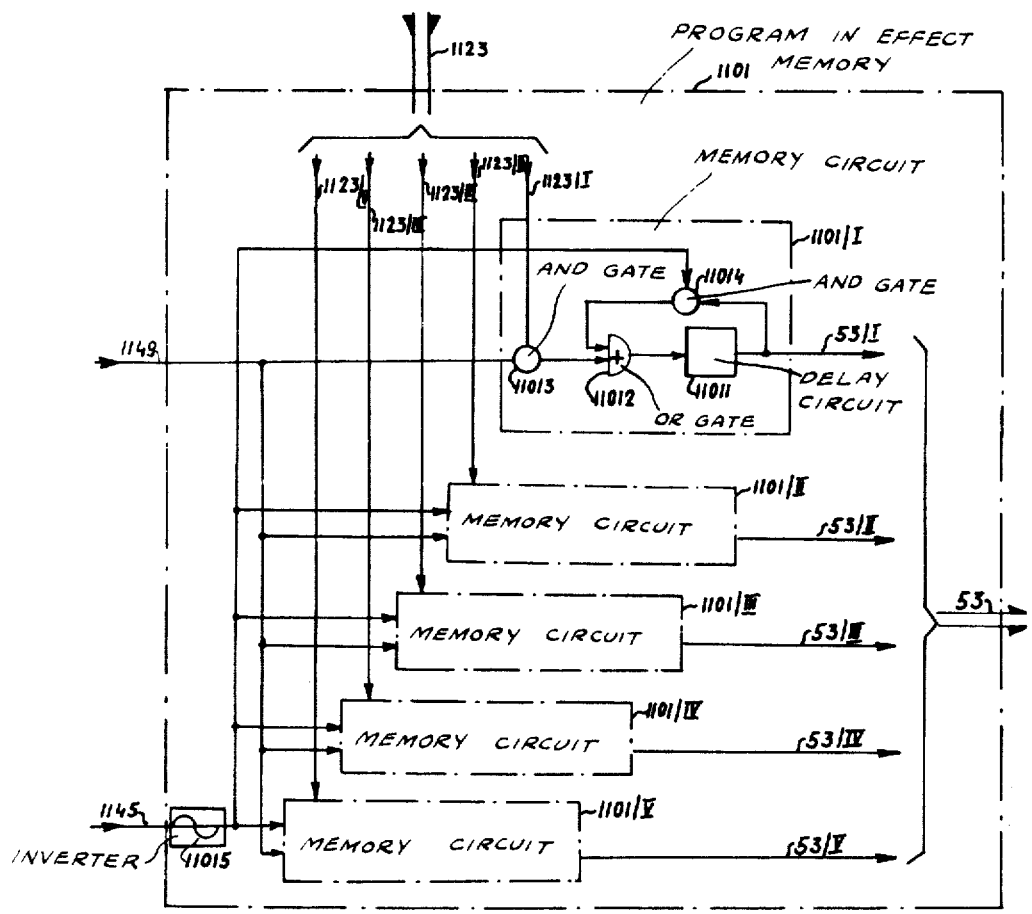
Figure 9:
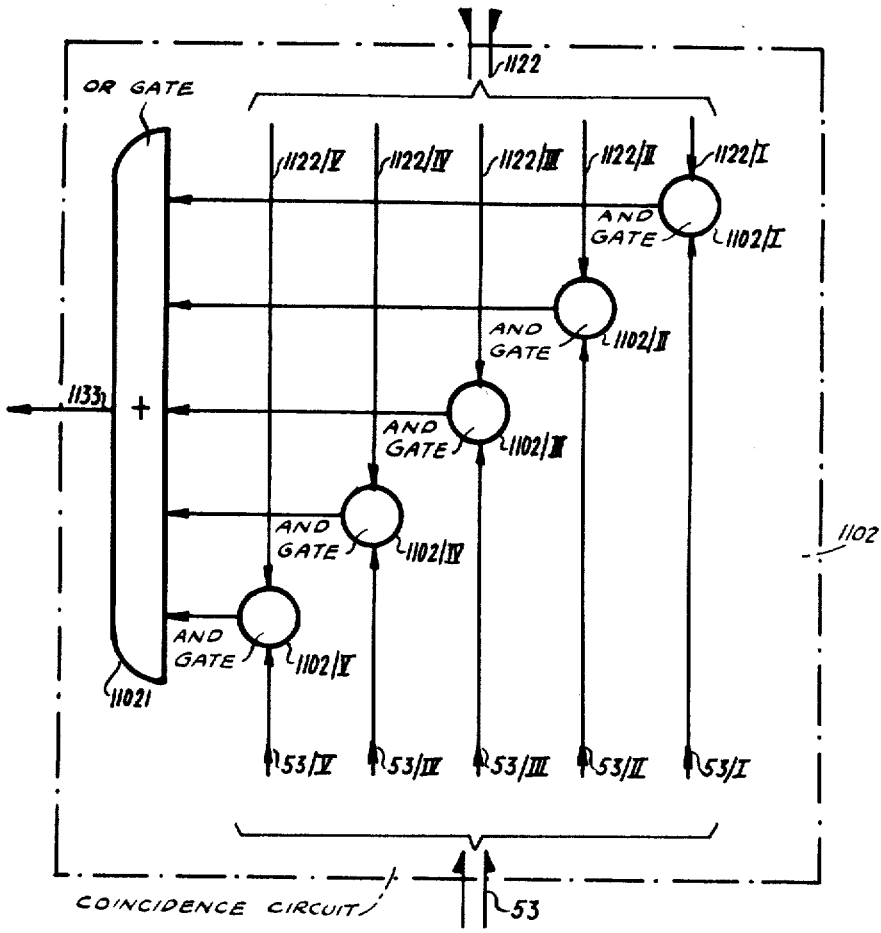
Figure 10:
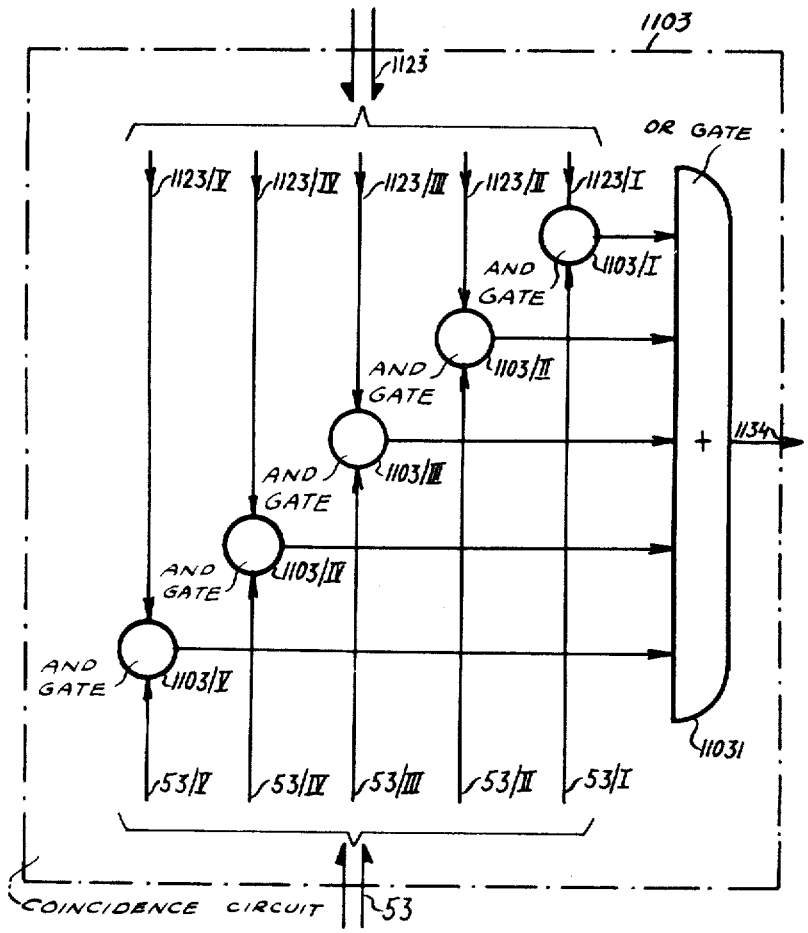
Figure 11:
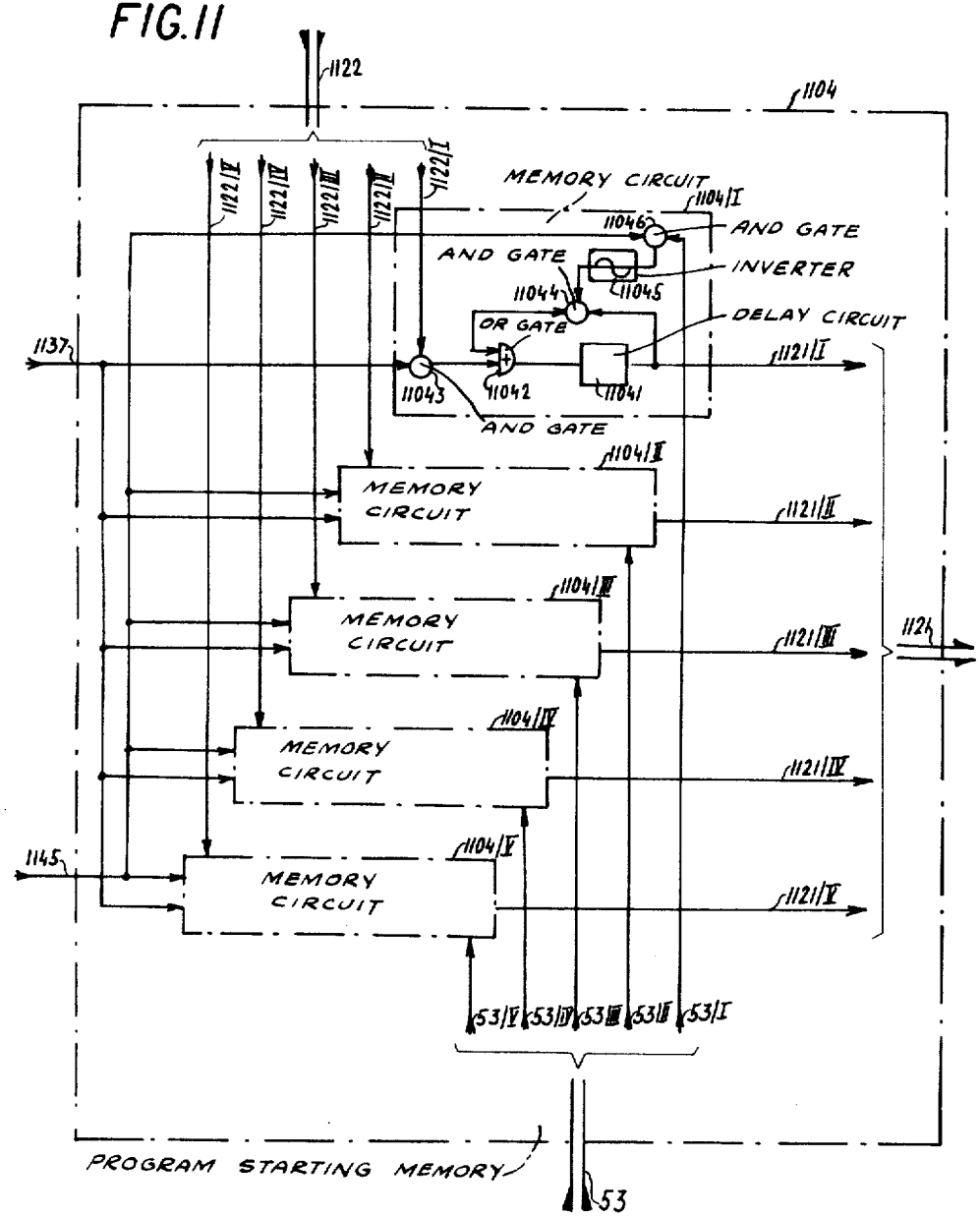
Figure 12:
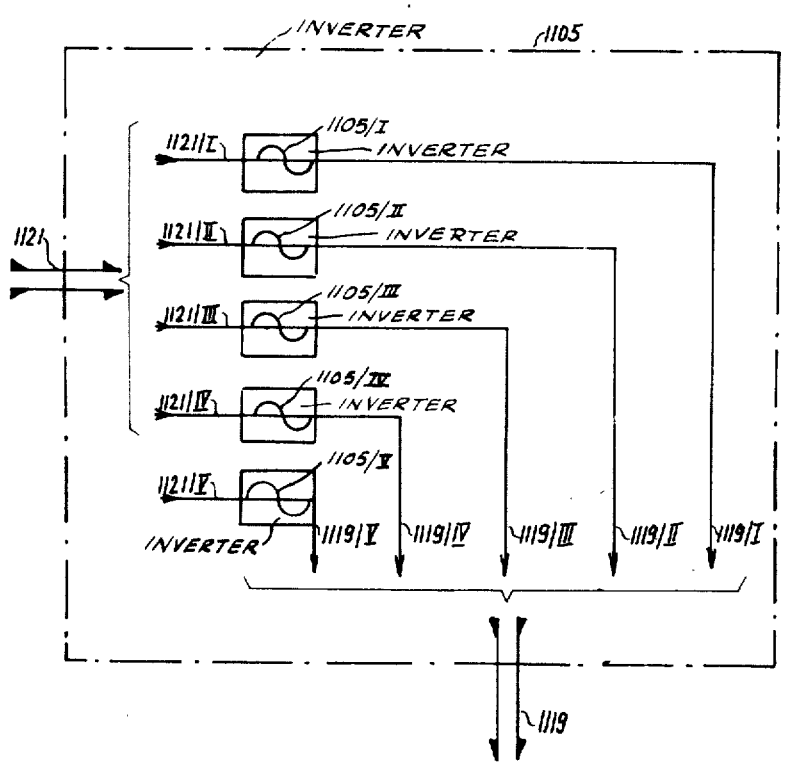
Figure 13:
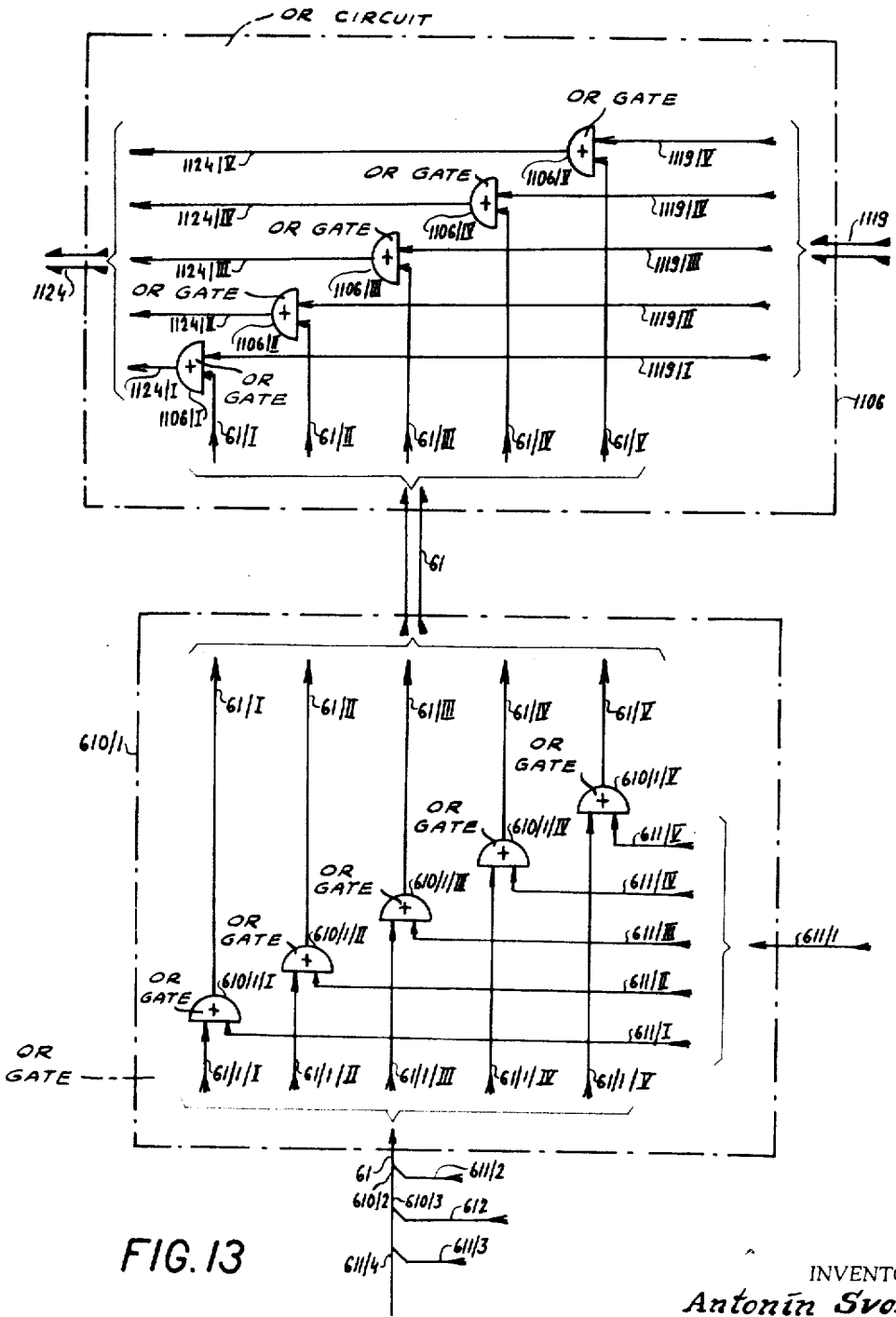
Figure 14:
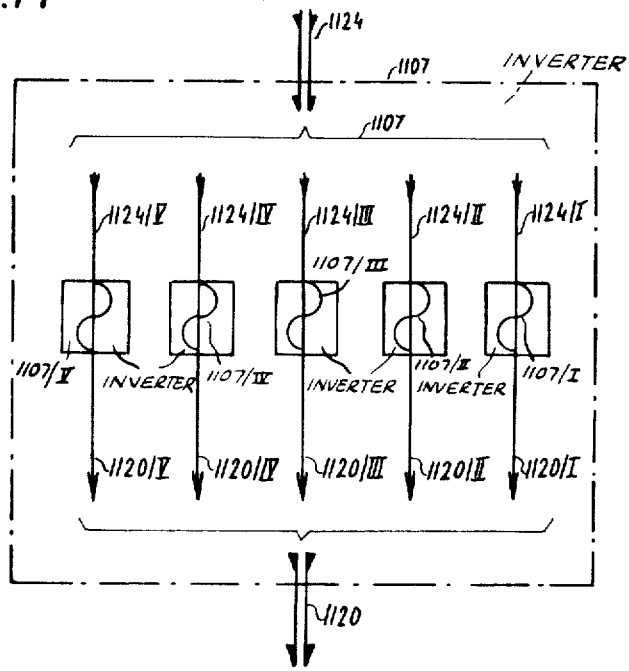
Figure 15:
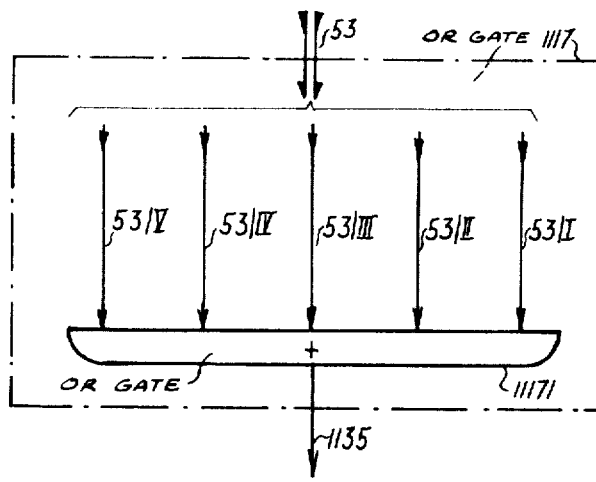
Figure 16:
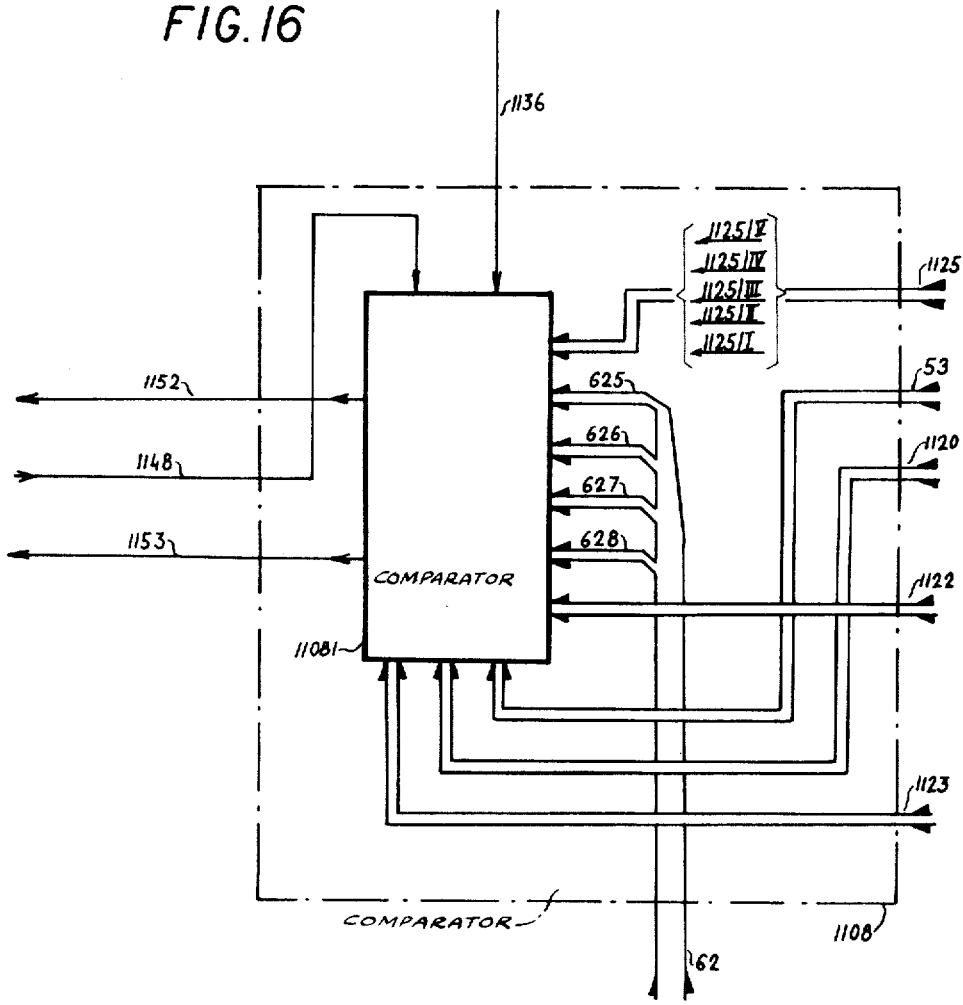
Figure 17:
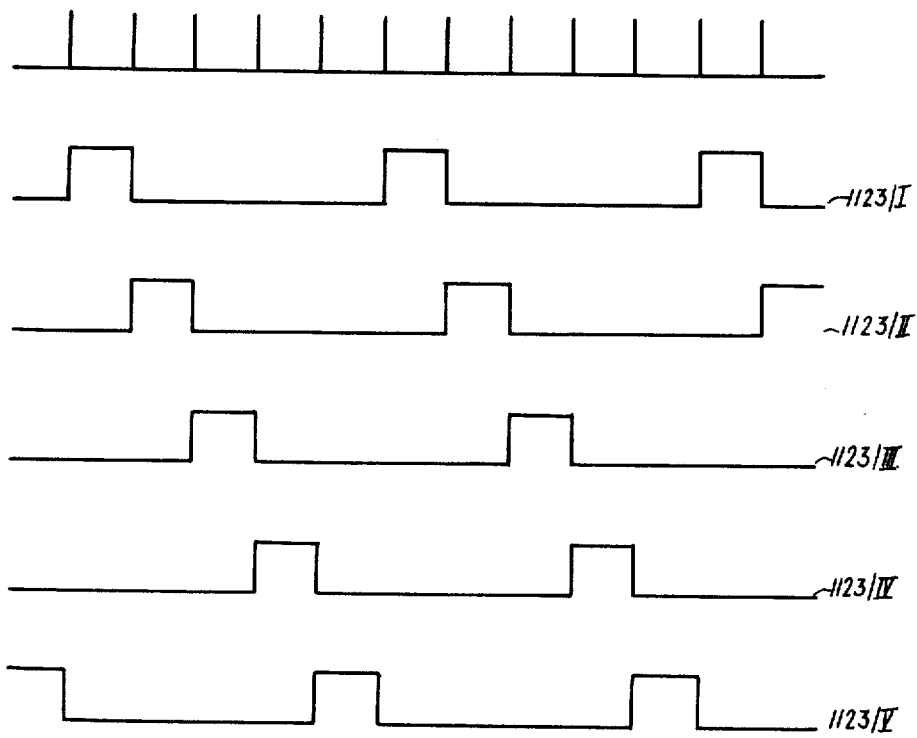
Figure 18:
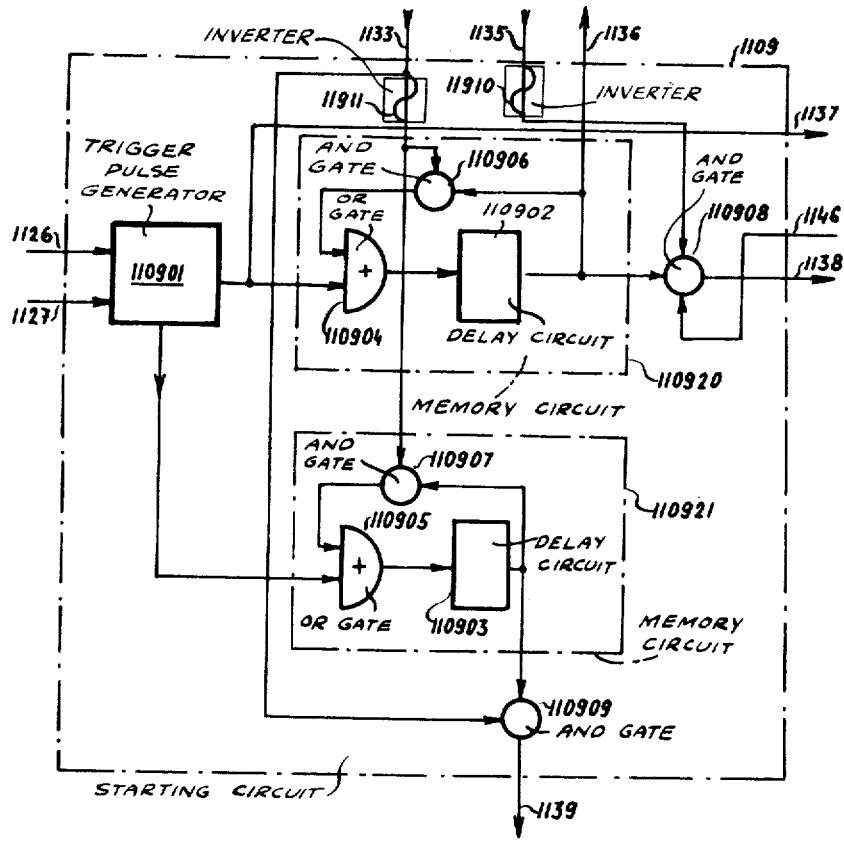
Figure 19:
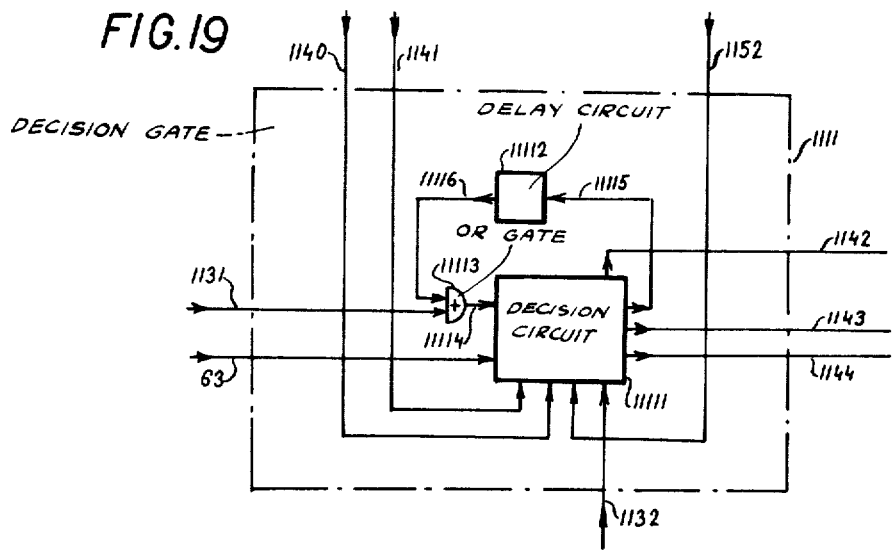
Figure 20:
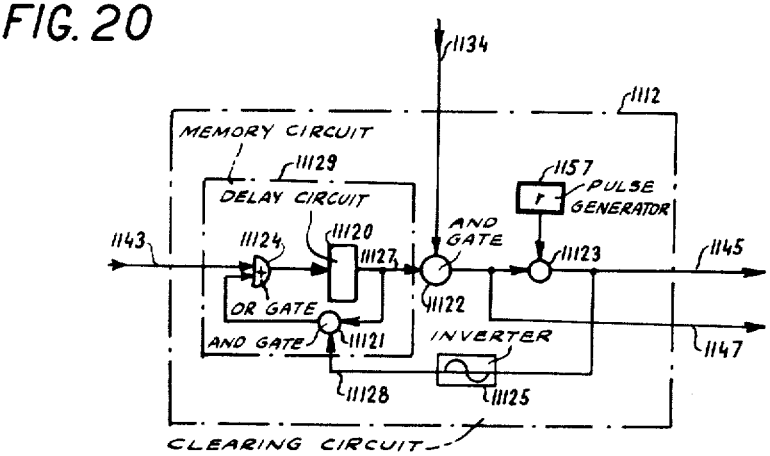
Figure 21:
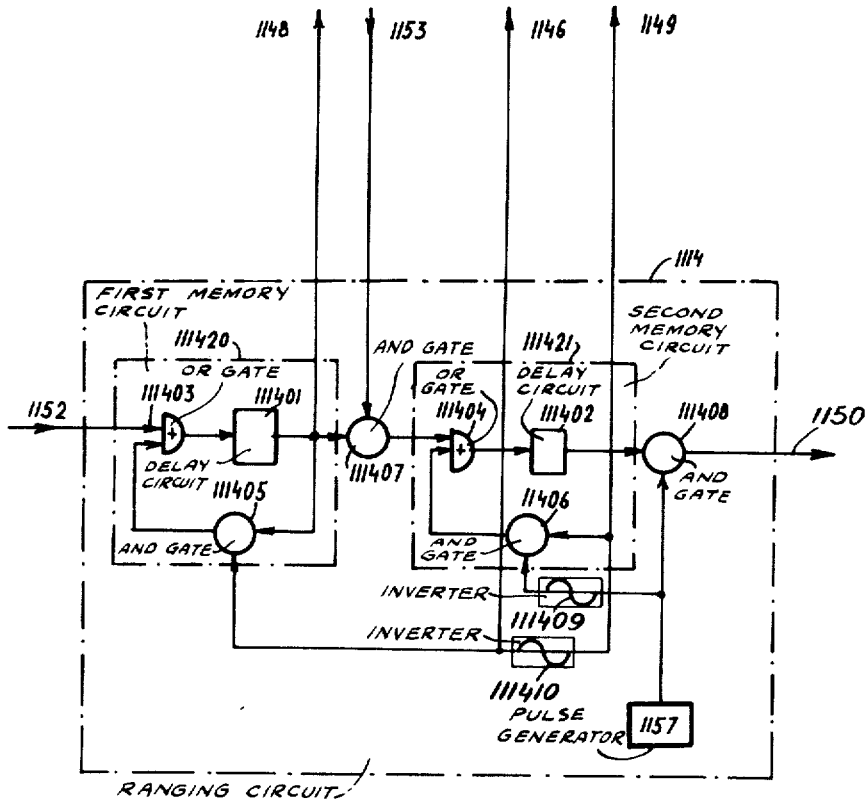
Figure 22A:
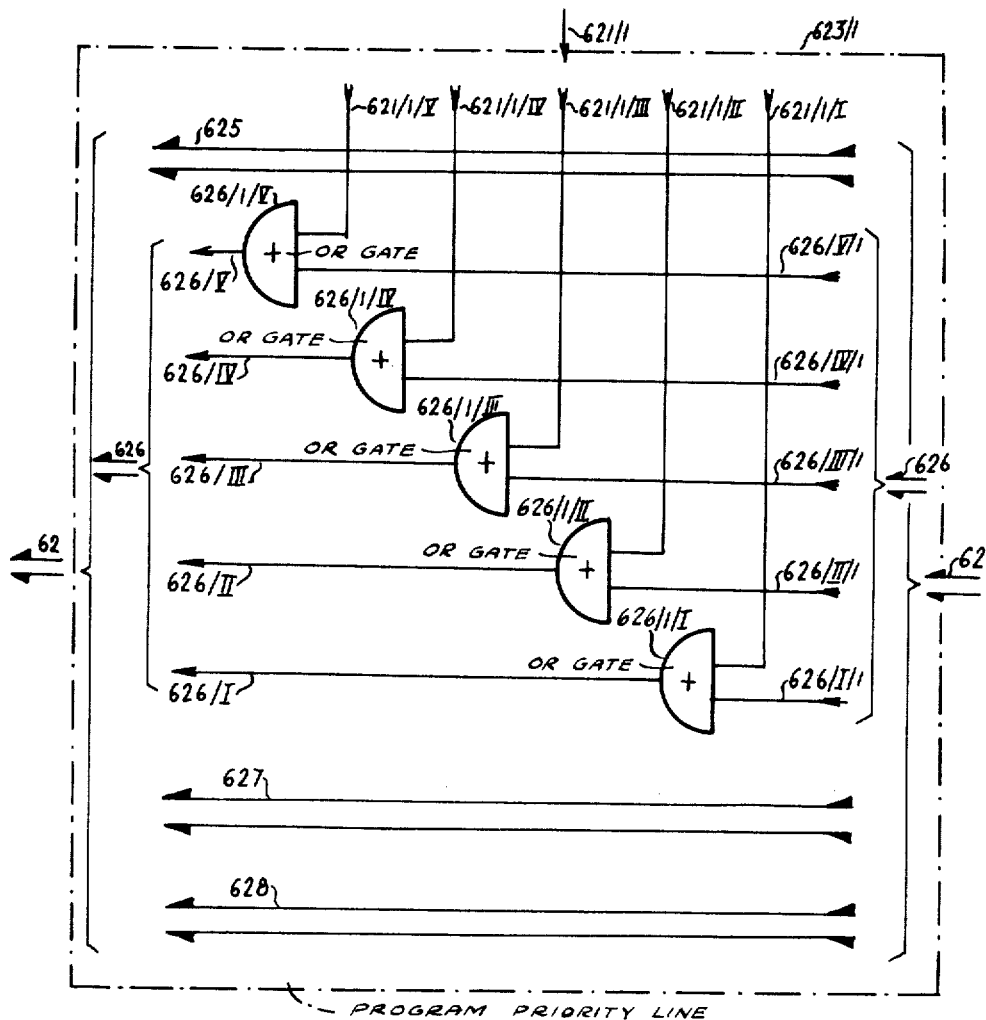
Figure 22B:
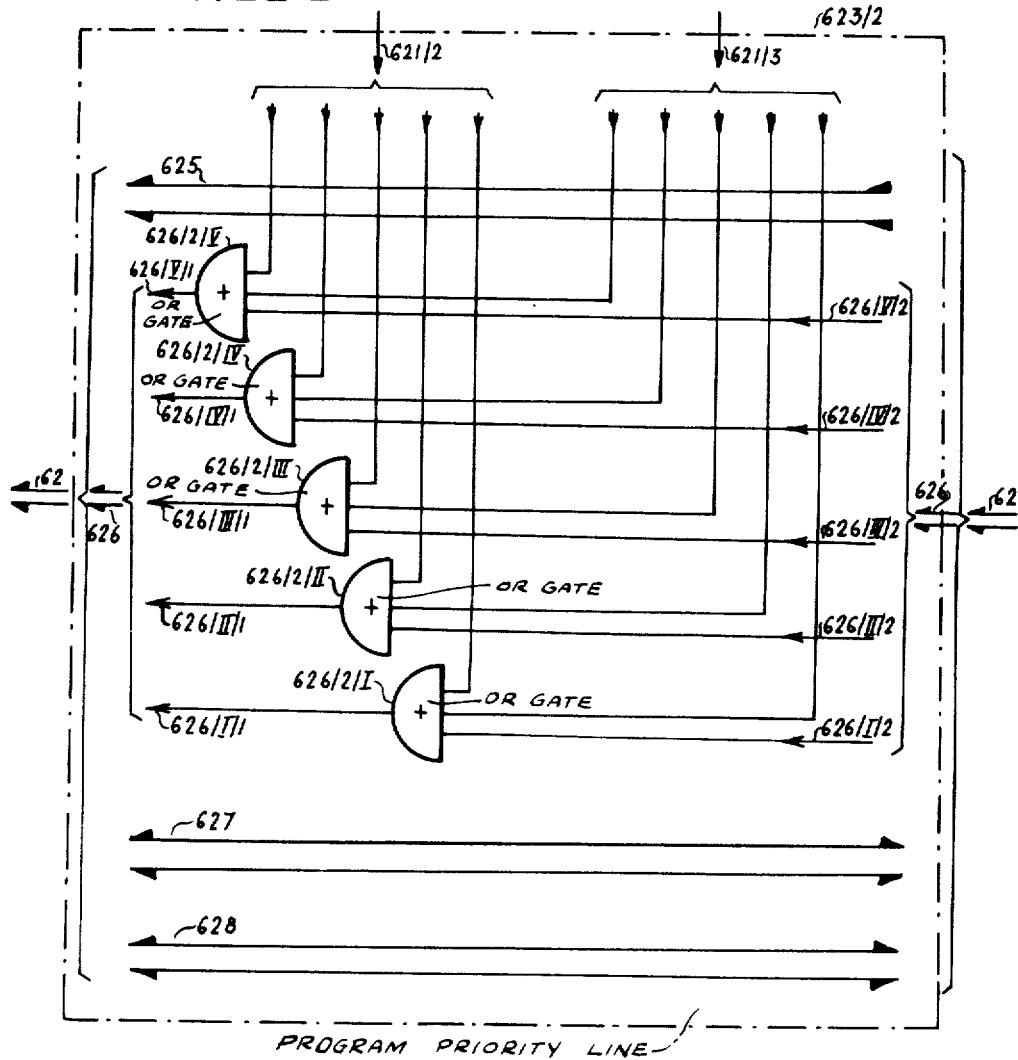
Figures 22C, 23:
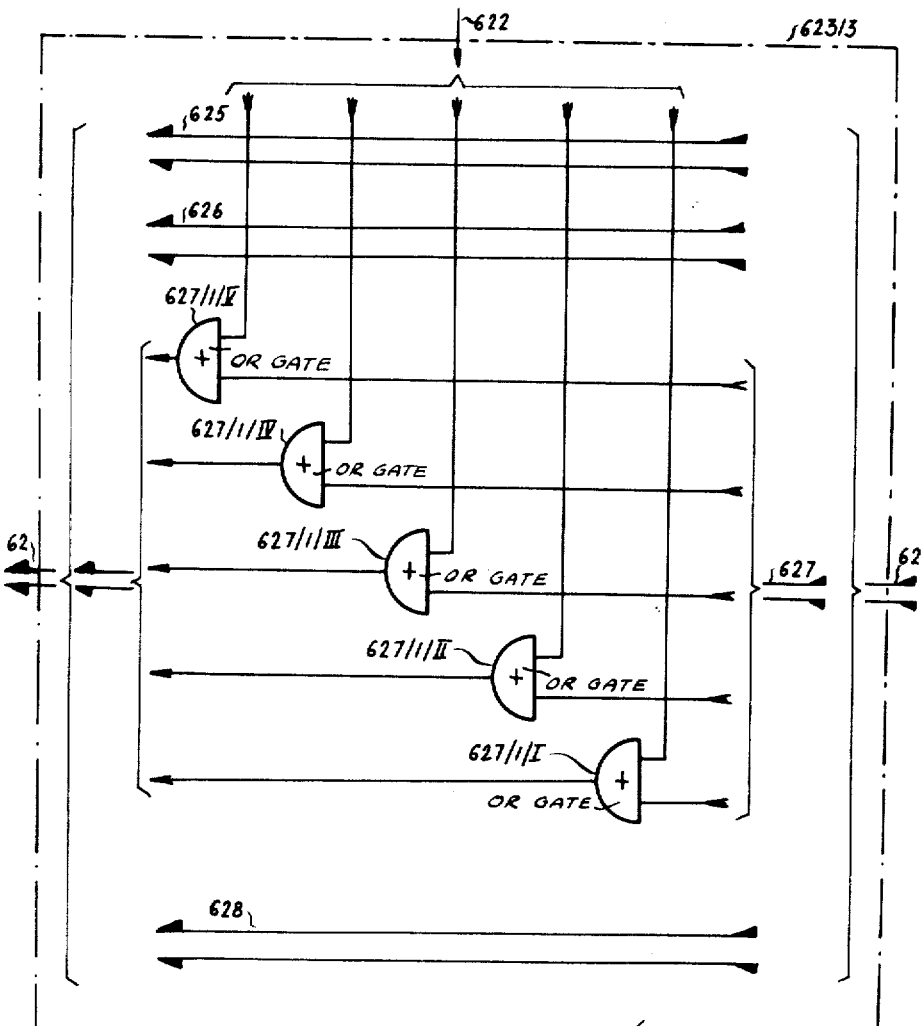

In the drawings:
FIG. 1, comprising FIGS. 1*a* and 1*b*, shows a block diagram of the system of the present invention;
FIG. 2 shows an exemplary embodiment of a peripheral unit module;
FIG. 3 is a block diagram of an auxilliary memory;
FIG. 4 is a block diagram of an arithmetic register;
FIG. 5 is a block diagram of a control register;
FIG. 6 shows the left part of the block diagram of an organisation-control unit;
FIG. 7 shows the right part of the block diagram of the organisation-control unit;
FIG. 8 shows a block diagram of the operation-program register 1101;
FIG. 9 is a block diagram of a coincidence circuit 1102;
FIG. 10 is a block diagram of another coincidence circuit 1103;
FIG. 11 is a block diagram of a register, 1104, for starting the program;
FIG. 12 shows an inverter 1105;
FIG. 13 shows an OR gate 1106;
FIG. 14 shows an inverter 1107;
FIG. 15 shows an OR gate 1117;
FIG. 16 shows a comparator 1108;
FIG. 17 represents the pulses on the bus 1123;
FIG. 18 illustrates a starting circuit marked 1109;
FIG. 19 illustrates a decision gate marked 1111;
FIG. 20 shows a clearing circuit marked 1112;
FIG. 21 represents a ranging circuit marked 1114;
FIG. 22*a*, FIG. 22*b* and FIG. 22*c* illustrate the arrangement of the program priority bus 62; and
FIG. 23 shows an application of the arrangement according to FIG. 22 to a plurality of peripheral unit modules.

For a clearer understanding of the invention, the same will now be described part by part, without, however, this mode of description having any effect on the unity of the present invention. The various parts of the system will be dealt with in separate sections of the description, with reference to the respective drawings.

(A0) *Block diagram of the system of the present invention*

FIG. 1 of the accompanying drawings shows a block diagram of an exemplary embodiment of the modular data processing system, intended for the parallel solution of several problems, according to programs which are independent of one another.

This system comprises a central unit module 1, a working memory module 2, an auxiliary memory module 3 and peripheral unit modules 4/1, 4/2, 4/3, etc. The auxiliary memory module 3 and the peripheral unit modules 4/1, 4/2, 4/3, etc., are connected to the central unit modules 1 by an output connecting channel 5 and an input connecting channel 6.

The central unit module 1 comprises primarily an organisation-control unit 11, a control unit 12 with a synchronizing pulse generator 121, a central register 13, arithmetic registers 14 with backing registers 141, auxiliary registers 15 with backing registers 151, a control register 16 with its backing register 161, a signalling unit 17 and a manual control unit 18.

The organisation-control unit 11 is connected, in the central unit module 1, via a control bus or line 101, to the registers 14, 15 and 16 and via a bus or line 104 in particular to the manual control unit 18, via a bus 105 to the signalling unit 17 and, via buses 106 and 107 to the control unit 12. The control unit 12 is in the central unit module 1 and is connected via a bus or line 108 to the manual control unit 18 and via a bus or line 109, to the signalling unit 17. A bus 110 connects the organisation control unit 11 to the control register 16.

The output connecting channel 5 comprises a synchronising bus or line 51, an address bus or line 52, a program bus or line 53, an OMEGA-signal bus or line 54 and a data output bus or line 55. Additional buses or lines 63 and 64 and the line provide a path for the OMEGA-signals. An OMEGA-signal is a signal, which is emitted when either the auxiliary memory module 3 or the peripheral unit module 4 have to be actuated.

Reference will be made further to an OMEGA-return signal, which is a signal emitted when the unit in question is in such a state that it is capable of performing the action called for.

An OMEGA-blocking signal is a signal emitted, if the unit in question is incapable of performing the specified operation.

The OMEGA-signal is emitted via the bus 54, by the organisation control unit 11, when the operation of any peripheral unit module 4/1, 4/2, 4/3 and so on or auxiliary memory module 3 is to be initiated. If the unit in question is capable of performing the desired action, it returns the OMEGA-return signal via the bus 64. If the unit in question is in a state in which it is incapable of performing the specified action, it returns the OMEGA-blocking signal via the bus 63 to the organisation control unit 11.

The synchronizing bus 51 leads from the control unit 12. The address bus 52 leads from the control register 16 and extends also to the working memory module 2. The program bus 53 leads from the organisation control unit 11 and is also connected to the working memory module 2. The OMEGA-signal bus 54 leads from the organisation-control unit 11. The data output bus 55 is connected to the central register 13.

The input connecting channel 6 comprises a program block bus 61, a program priority bus 62, an OMEGA$_B$ blocking signal bus 63, an OMEGA$_N$ return signal bus 64, a data bus 65 and a condition transmitting bus 66. The program block bus 61, the program priority bus 62 and the OMEGA$_B$ blocking signal bus 63 all lead to the organisation control unit 11. The OMEGA$_N$ return signal bus 64 and the condition transmitting bus 66 lead to the control unit 12. The data bus 65 is connected to the central register 13.

The working memory module 2 comprises a working memory unit 21, a manual switching unit 22 and an address switch 23. The working memory module 2 is connected, through buses 201 and 202 to the central register 13 and through a bus 203 to the address switch 23 and, finally, through a control bus 205, to the control unit 12. The address switch 23 is connected through a bus 204 to the manual switching unit 22 and through a bus 206 to the organisation-control unit 11.

The central unit module 1 is substantially an automatic digital computer controlled by a program stored, for instance, in the working memory module 2. The auxiliary memory module 3 comprises, for instance, a high-capacity auxiliary memory; the peripheral unit modules 4/1, 4/2 etc. comprise, for instance, magnetic tape memories, punched card or punched tape operated input and output units, printers, analog-digital and digital-analog converters used in connection with controlled manufacturing and similar processes and the like. The number and type of the various peripheral unit modules can be chosen substantially as desired, as will appear from the following disclosure.

(A1) *Operation of the system (FIG. 1)*

(A1.0) instructions

The operation of the system shown in FIG. 1 involves the processing of data according to one or a plurality of programs stored, for instance, in the auxiliary memory module 3 in the form of one or a plurality of sets of instructions, each of said instructions containing substantially directions for effecting one operative step. The term "operative step:" is to be understood as comprising the performance of actions specified by one instruction. The instruction can contain various numbers and kinds of data. In the example disclosed hereinafter it will be assumed that the instruction consists of an address part and of an operational part.

The operational part of the instruction specifies always that operation which has to be effected by the central unit module 1. The address part may have one of the following four meanings:

(a) It supplements the specification of the operation of the central unit module 1 (for instance the number of lines through which the contents of one of the registers has to be shifted in the course of the shifting operation), (b) It represents directly the number (constant) which has to enter the specified operation (for instance adding the constant to the contents of any of the registers), (c) It indicates in the working memory module 2 or in the auxiliary memory module 3 the address of the number which has to enter the specified operation or where the result of the operation has to be stored, (d) It specifies the operation to be carried out by one of the periphery unit modules 4/1 or 4/2, etc. (likewise specified), either independently (for instance winding over the tape in the tape memory) or in cooperation with the central unit module (for instance transfer of data from the working memory module 2 through the central register 13 to the printer and printing of the data).

The meaning of the address part of the instruction is given by the character of its operational part and, for the instructions are hereinafter classified as type (a), (b), (c) or (d).

(A1.1) *Parallel solving of programs*

The data processing system according to the invention permits the simultaneous processing of a number of independently prepared programs. The maximum number of programs thus processed is given by the actual arrangement of the system and in the following disclosure a system adapted for processing five programs, numbered I, II, III, IV and V will be considered by way of example. To each of these programs there is reserved, prior to its starting by means of the address switch 23, a certain part of the working memory module 2 and, similarly, by means of the address switch 34 (see FIG. 3) also a certain part of the auxiliary memory module 3. The necessary peripheral unit modules 4/1, 4/2 etc. are also assigned to the program. Each of these five independent programs can be started or stopped independently. The organisation control unit 11 controls the operation of the entire system in such a manner as to initiate the performance of the individual programs in a sequence determined by their basic priority and by the momentary state of the peripheral unit modules assigned to them.

(A1.2) *Execution of instructions*

(A1.20) Type (a) and (b) instructions

The operation of the system during the execution of one program will be described first, beginning from the moment when the control register 16 contains an instruction $I_p$, which has just to be executed.

At this moment an information relating to the address part of the instruction $I_p$ is transmitted through the address bus 52 and through the bus 110, an information relating to the character of the operational part of the instruction $I_p$ is transmitted to the organisation control unit 11. The latter ascertains first, on the basis of signals on the program priority bus 62 or on the bus leading from the manual control unit 18, whether the priority of the program then in operation or effect, to which the instruction $I_p$ relates, is lower than that of any other of the five programs. If that were the case, the organisation control unit, would initiate a so-called "clearing of the program," which operation will be described in detail at a later stage (see paragraphs A 1.231, A 1.3 and B 3.21).

It may be assumed that this condition is not fulfilled, i.e. the program in effect has a priority equal to or higher than the priority of the other programs. In this event, the organisation control unit 11 will initiate the execution of the instruction $I_p$. If this instruction is of the type (a) or (b), (see paragraph A 1.0), the organisation control unit 11 initiates, through the bus 106 leading to the control unit 12, the execution of this instruction in the central unit module 1.

(A1.21) *Type (c) instruction*

If the instruction $I_p$ is of the type (c) and the address part indicates, for example, the address of the word in the working memory unit 21, which has to enter the operation, it is in the first place the address switch 23 which becomes operative. This ascertains, on the basis of the information relating to the address part of the instruction $I_p$ on the address bus 52, the information relating to the number of the program in effect on the program bus 53 and the information relating to the address assigned to this program (said information having been introduced through the bus 204 from the manual switching unit 22), whether the address part of the instruction $I_p$ has not deviated from the assigned limits, for instance due to errors in the program, whereupon it transfers the address part to the so-called effective address, which is introduced through the bus 203 into the working memory unit 21.

The introduction of the effective address makes it possible that one and the same program may, at different times of its application in the same, have assigned different parts of the working memory module 2, without any need to change the address parts in its instructions. If, for example, this program uses 100 addresses numbered in its instructions from 0 to 99, it is possible to assign to them, at different periods of use of said program, by means of the address switch 23, at one time the effective addresses, for example, 200 to 299, another time 800 to 899, still another time 100 to 199, without any need to change the program in any way from one case to the other. Other possibilities of modifying the addresses (index registers and the like) remain open.

A deviation of the address, if any, from the assigned limits, is transferred by the address switch 23 to the organisation control unit 11 by means of a signal on the bus 206. The organisation control unit 11 responds to this signal by stopping the respective program and by emitting a signal through the bus 105 to the signalling unit 17.

If there is no deviation of address, the organisation control unit 11 initiates, by means of a signal transmitted through the bus 106 to the control unit 12, the execution of the operation. The control unit 12 initiates, by emission of a suitable signal through the bus 205, the emission of a word provided by the effective address on the bus 203, namely through the bus 201 to the central register 13, whence this word enters the provided operation. The result of the operation is stored, according to a more detailed specification of the operation, either in one of the arithmetic registers 14 or in auxiliary registers 15 or, via the central register 13, and through the bus 202 in the working memory unit 21. During the process of storing the results in the working memory unit 21, the address switch 23 becomes operative, in the same way as during reading of the word from the working memory unit 21. The character of type (c) instructions is inherent also in those instructions, by means of which the contents of any of the arithmetic registers 14 or auxiliary registers 15 is stored in the working memory unit 21. The operation of the address switch 23, when processing these instructions, is the same as in the example disclosed above.

(A1.22) *Sequencing (exchange) of instructions*

After the actual operation, specified by the instruction $I_p$, has been effected, the control unit 12 usually initiates the transmission of a number from the so-called counting register, which is one of the auxiliary registers 15 (and contains the address of the subsequent instruction), to the address part of the control register 16 and, simultaneously, the contents of the counting register is increased by a "1." The contents of the address part of the control register 16 is introduced, through the address bus 52, via the manual switching block 22 into the working memory unit 21 in the form of an effective address.

The control unit 12 then initiates the emission of the instruction, thus selected, through the central register 13 to the control register 16. During the transmission between the central register 13 and the control register 16, a modification of the address part of the instruction can be accomplished, if this is specified, for instance by the contents of any of the auxiliary registers 15. As soon as this new instruction $I_{p+1}$ is present in the control register 16, the control unit 12 emits a signal through the bus 107 to the organization control unit 11 and the entire operation, as disclosed, can proceed again, under the control of the new instruction $I_{p+1}$, however. The procedure described above may be modified in various ways. Thus, for example, the instruction which is to follow may be selected from any of the auxiliary registers 15, or conditional as well as unconditional jumps in the sequence of address of subsequent instructions can be carried out, etc.

(A1.23) *Type (d) instructions*

If the instruction $I_p$ is of the (d) type, the organisation control unit 11 transmits an OMEGA-signal to the OMEGA-signal bus 54 of the output connecting channel 5. At the same time, the address part of the instruction $I_p$ is transmitted to the address bus 52 and transmitted to the program bus 53 is the number of the running program, of which the instruction $I_p$ is a part.

The auxiliary memory module 3 and the peripheral unit modules 4/1, 4/2, etc., are arranged in such a way, that only that device which is assigned to the program in effect responds to the OMEGA-signal, while the type of the device, its selection (such as ordinal number $a'$) as well as the required response are determined by the address part of the instruction $I_p$, introduced through the address bus 52 to all peripheral unit modules, as well as to the auxiliary memory module 3. According to the momentary condition of the thus determined peripheral unit module and the required response, two alternatives are possible:

(a) The unit is capable of performing the required operation and the instruction is executed;

(b) The unit is then incapable of performing the required operation and an exchange of the program is effected.

(A1.231) *Execution of instruction*

In this case the execution of the required operation is initiated in the peripheral unit module and, simultaneously, an OMEGA-return signal $\Omega_N$ is emitted through the (OMEGA-return signal bus 64) to the control unit 12 of the central unit module, which initiates either the required cooperation of the central unit module 1 with the working memory module 2, if this operational part of the instruction $I_p$ is specified, for example, the transmission of data from the working memory unit 21 through the central register 13 and data output bus 55 to the peripheral unit module, or the transmission of data from the peripheral unit module through the data input bus 65 via the central register 13 to the working memory unit 21, and thereupon the supply of a new instruction, or it initiates directly the supply of a new instruction in a manner similar to that described above.

During the supply (or sequence) of a new instruction the control unit 12 can respond to a condition signal, transmitted through the condition transmitting bus 66 of the peripheral unit module, which has been most recently actuated, i.e. for instance by effecting a jump in the program.

(A1.232) Exchange of program

It is assumed that the peripheral unit module is incapable of executing the required operation, for instance for the reason that it has not yet terminated the operation initiated by one of the preceding instructions. In such a case the peripheral unit module transmits an OMEGA-blocking signal $\Omega_B$ to the organisation control unit 11 through the OMEGA-blocking signal bus 63 and, simultaneously, it signals through the program block bus 61 the blocking of the program, to which the respective peripheral unit module is assigned. While the OMEGA-blocking signal $\Omega_B$ on the bus 63 has the character of an impulse, the blocking of the program by means of a signal on the program block bus 61 is of a lasting character and lasts until the respective peripheral unit module assumes the state of readiness.

The organisation control unit 11 responds to the OMEGA-blocking signal $\Omega_B$ by initiating in the central unit module 1 a so-called "clearing of the program" in effect.

When clearing the program in effect, the organisation control unit 11 initiates by a signal on the bus 101 a transfer of contents of the arithmetic registers 14, auxiliary registers 15 and of the control register 16 to their backing registers 141, 151, or 161, respectively. In the backing registers the contents of each register remain stored in those sections of said backing registers which are reserved for the program, which has been most recently cleared. For instance, each of the aforementioned five independent programs which can be processed simultaneously by the system according to the invention, has a certain section reserved in said backing registers 141, 151, 161, where, after the clearing operation, all information is retained which is necessary for the continuation of said program. Retained in particular in the backing register 161 is the last not-executed instruction of each of said five programs, in the backing register 151 the contents of the respective auxiliary registers 15 (including the counting register) and in the backing register 141 the contents of the respective arithmetic registers 14.

If the clearing of the program has to be carried out during a period, when in the central unit module any arithmetic operation is still proceeding (which fact is signalled to the organisation control unit 11 through the bus 107 from the control unit 12), the organisation control unit 11 will postpone the clearing of this program until the arithmetic operation is terminated. After the program in effect has been cleared, the organisation control unit 11 initiates a so-called "inducing of the program."

Inducing of the program

During this operation the organisation control unit 11 effects the processing of signals on the program block bus 61, signals on the program priority bus and signals on the bus 104 from the manual control unit 18, which signals indicate, whether and with what priority the respective program of said five programs has been started. The meaning of signals on the program block bus has already been described before. The signals on the program priority bus arrive from various peripheral unit modules, which are ranged in groups according to different priority degrees. This ranging of the peripheral unit modules may vary according to their character, performance, recurrence of operation and the like.

An example showing how the peripheral unit modules are ranged in groups, is illustrated in the following Table A.

TABLE A

| Peripheral unit module: | Degree of priority |
|---|---|
| Magnetic drum memory (auxiliary memory unit) | 3 |
| Magnetic tape memory | 4 |
| Mechanical input and/or output devices | 5 |
| Real time process control unit | 6 |

By transmitting a signal relating to the respective degree of priority along the program priority bus 62 to the organisation control unit 11, the peripheral unit module signals for an intervention by the central unit module 1.

In the described example, each of said five programs can, at a certain moment, have one or more priority degrees at the same time, as will appear from the following Table B.

TABLE B

| Priority degree: | State of the program |
|---|---|
| 0 | Program either stopped or blocked from the peripheral unit module. |
| 1 | Program started with lower basic priority. |
| 2 | Program started with higher basic priority. |
| 3 | The peripheral unit module with priority degree 3 requires for an intervention by the program. |
| 4 | The peripheral unit module with priority degree 4 requires an intervention by the program. |
| 5 | The peripheral unit module with priority degree 5 requires an intervention by the program. |
| 6 | The peripheral unit module with priority degree 6 requires an intervention by the program. |
| 7 | An intervention of the program is undertaken by the manual control unit 18 (starting or stopping of the program). |

By means of signals transmitted through the aforementioned buses 61, 62 and 104 an information is fed to the organisation control unit 11 for each of the five programs, indicating whether at the given moment, the respective program has been started or stopped, blocked or released and which is its instantaneous priority. The program being processed having been cleared, the organisation control unit 11 initiates, on the basis of this information, the inducing of that program which has been started, has not been blocked, has at the moment the highest priority degree and, among the programs meeting the aforementioned conditions, is in the cyclic sequence next following the program which has been most recently cleared.

The actual inducing of the program selected in view of the aforementioned conditions, is effected by the organisation control unit 11 by means of a signal transmitted through the bus 101 which initiates the transfer of the contents from those memory sections of the backing registers 141, 151 and 161 (arithmetic and auxiliary registers, control register) which are assigned to the program to be induced, to the arithmetic registers 14, auxiliary registers 15 and control register 16, whereupon it initiates the actual execution of the instruction, which thus has reached the control register 16. In the registers of the central unit module 1 the state is restored which was present at the moment, that the program was interrupted and cleared. The induced program then proceeds as described above until it is either cleared or stopped.

(A1,3) Organisation control unit

The organisation control unit 11 permanently follows the instantaneous states of priority of all programs and initiates the clearing of the program in effect not only when such program is either blocked or stopped, but also at such time that any of the remaining programs attains a higher priority degree that that of the program which is then in effect. The organisation control unit initiates the clearing operation at the moment that the instruction $I_p$ is in the control register 16 which is next to be executed but whose execution has not yet been started.

Each of the five programs for whose solution the system shown in FIG. 1 is intended, can in these states be: "started," "in effect," "blocked."

The starting of the program is initiated from the outside by means of the manual control block 18. Prior to starting the program, the initial instruction has to be inserted into the backing register 161 of the control register 16, in that memory section which is assigned to the started program. When the program is manually started, the execution of this instruction is initiated, the organisation control unit 11 then determining further processing. The end of the state "program started" can be initiated either from the outside by means of the manual control unit 18 or by a special instruction.

In accordance with the conditions mentioned above, the organisation control unit 11 decides, whether the started program is in the "in effect." The blocking of the program is derived from the operation of the peripheral unit modules assigned thereto.

In the central unit module 1 there is at any moment never more than one program in the "in effect" condition or state. The other programs may be in "started" or "blocked" or both conditions or states.

(A2) *Peripheral unit module, type 4*

The block diagram shown in FIG. 2 represents an exemplary embodiment of a peripheral unit module which is part of the data processing system according to the present invention, as shown in FIG. 1, and which by an intervention from the outside may be assigned to one of, for instance, five programs treated by said data processing system.

The peripheral unit module 4 comprises a discriminating circuit 41, a control unit 42 and the peripheral memory unit 43.

The discriminating circuit 41 comprises a program number selector 411, a unit number selector 412, a selector circuit 413, a blocking gate 414, an initiating circuit 415 and a program block memory 416.

The peripheral memory unit 43 includes, for instance, primarily an input buffer memory 431 and an output buffer memory 432. The peripheral memory unit 43 is represented, for instance, either by a magnetic tape memory or a punched card reader or a tape punch, or a punched tape reader, or a card punch or a printer, etc. It depends on the character of the unit, whether in a particular embodiment the peripheral memory unit 43 should be equipped with both or with one of said buffer memories 431 or 432.

The peripheral unit module 4 is attached to the various lines of the output connecting channel 5, as well as to the input connecting channel 6. The synchronizing branch 511 of the synchronizing line or bus 51 leads into the peripheral unit module 4. This bus serves to feed synchronizing pulses to all partial circuits of the peripheral unit module 4. The address branch 521 of the address bus 52 leads to the selector circuit 413, to the blocking gate 414 and to the initiating circuit 415. The program branch 531 of the program bus 53 and the OMEGA-signal branch 541 of the OMEGA-signal bus leads to the selector circuit 413. Finally, the output branch 551 of the data output bus is connected to the input buffer memory 431 (of the peripheral memory unit 43). Connected to the various lines of the input connecting channel 6 are a program block branch 612 of the program block memory 416 to the program block bus 61, a program priority branch of the peripheral module control unit 42 to the program priority bus 62, an OMEGA-blocking signal branch 632 and an OMEGA-return signal branch 642 of the blocking gate 414 to the OMEGA-blocking signal bus 63 and to the OMEGA-return signal bus 64 respectively, a data branch 654 of the output buffer memory 432 to the data bus 65 and an output branch 653 of the peripheral module control unit 42 is attached to the condition transmitting bus 66.

The program number selector 411 is connected through a bus 417 to the selector circuit 413, to the peripheral unit control unit 42 and to the program block memory 416.

The unit number selector 412 is connected through a bus 418 to the selector circuit 413. The blocking gate 414 is connected through a bus 419 to the selector circuit 413 and through a bus 421 to the peripheral module control unit 42. The initiating circuit 415 is attached to the OMEGA-return signal branch 642 of the blocking gate 414 and controls through the bus 428 the peripheral module control unit 42. The program block memory 416 is also connected to the OMEGA-blocking signal branch of the selector circuit and to the output 423 of the peripheral module control unit 42. The latter is further connected to the peripheral memory unit proper 43 through a control bus 422 and return bus 433.

(A2.1) *Operation of the peripheral unit module*

The peripheral unit module 4 cooperates with the central unit module 1 (FIG. 1) when solving a problem according to one of, for example, five programs, as disclosed in the explanation of the operation of the central unit module 1. Before starting the program, the program number (for example III) is set by the program number selector 411 (for instance programs I to V), the peripheral unit module 4 being thereby assigned to said program number. By means of the unit number selector 412 the required number "*a*" is determined, which indicates the selected peripheral unit module in the program. During operation of the central unit module 1, the latter always transmits an OMEGA-signal to the OMEGA-signal bus 54 when (FIG. 1) an instruction of the type (*d*) appears (see section A1.0 of the foregoing description in its control register 16). This signal is supplied via the OMEGA-signal branch 541 of the OMEGA-signal bus 54 in the selector circuit 413 and, if at this moment the number of the program in effect, as signalled by the program branch 531 of the program bus 53, coincides with the program number as set by the program number selector 411 and if, also, the type and number of the peripheral unit module, as indicated by the address part of the instruction, and signalled by the address branch 521 of the address bus 52, coincides with the type of the peripheral unit module and its number "*a*," as set by the unit number selector 412, the selector circuit 413 transmits a signal through the bus 419 to the blocking gate 414. The circuit of the blocking gate 414 determines either that the required operation may be executed or that it cannot be executed at that instant, based on the instantaneous state of the peripheral unit module, as signalled by the bus 421 from the peripheral module control unit 42 and based on the type of operation required from the peripheral memory unit 43 and signalled by the address branch 521.

(A2.10) *Nonexecutable operation*

If the required operation cannot be executed, the blocking gate 414 emits a signal to the OMEGA-blocking signal branch 632 which is connected, on the one hand, to the OMEGA-blocking signal bus 63 leading to the central unit module 1 (FIG. 1) and, on the other hand, to the program block memory 416. The latter emits through the program block branch 612 to the program block bus 61 a continuous signal for blocking that one of, for example, five programs to which the peripheral unit module 4 is assigned by the program number selector 411. The emission of the blocking signal lasts until the peripheral module control unit 42 resets through the bus 423 the program block memory 416 at the moment that the peripheral memory unit proper 43 reaches a state of readiness for further operations.

(A2.11) *Executable operation*

If the required operation can be executed, the blocking gate 414 emits a signal to the OMEGA-return signal branch 642, which is connected, on the one hand, to the OMEGA-return signal bus 64 leading to the central unit module 1 (FIG. 1) and, on the other hand, to the initiating circuit 415. The initiating circuit 415 imparts, on the basis of this signal, a pulse through the bus 428 to the peripheral module control unit 42, to effect the operation in the periphery memory unit 43, the type of operation (required response by the peripheral memory unit 43) being also determined by the address part of the instruction, as signalled on the address branch 521 of the address bus 52 from the central unit module.

The peripheral module control unit 42, by means of the control bus 422 and the bus 433, controls the operation of the peripheral memory unit 43. This is accomplished by emitting the necessary signals to the blocking gate 414, as well as to the program block memory 416. Furthermore, the peripheral module control unit 42 can emit, through the program priority branch 621, a signal to the program priority bus 62, in order to raise the priority of that program to which the peripheral unit module 4 is assigned by the program number selector 411. This occurs particularly, if in the peripheral unit module 4 a program intervention is desired.

(A2.2) *Examples*

The following Table C shows the operations of the peripheral unit module 4 in connection with three exemplary embodiments of the peripheral memory unit proper 43, carried out as a magnetic tape memory, as a line printer and as a punched card reader.

TABLE C

[Examples of operation of the peripheral unit modules and their codes in the address part of the instruction for the central unit module.]

| Address part of instruction | Type of instruction | Description of operation initiated by this instruction in the peripheral unit module |
|---|---|---|
| | | Operation of magnetic tape memory "*a*" (code 42 . . . *a*) |
| 4200*a* | $d_1$ | Shift tape in unit "*a*" forward by one data block. |
| 4210*a* | $d_1$ | Shift tape in unit "*a*" back by one data block. |
| 4201*a* | $d_1$ | Wind tape in unit "*a*" forward to section mark. |
| 4211*a* | $d_1$ | Wind tape in unit "*a*" back to section mark. |
| 4202*a* | $d_1$ | Wind tape in unt "*a*" to the end (forward). |
| 4212*a* | $d_1$ | Wind tape in unit "*a*" to the beginning (back). |
| 4203*a* | $d_2$ | Transfer data block from the central unit module to input buffer memory 431 of the unit and record data on tape (forward). |
| 4205*a* | $d_3$ | Transmit data block from the output buffer memory to the central unit module and read next data block into output buffer memory 432. |
| | | Operation of line printer *a* (code 44 . . . *a*) |
| 4401*a* | $d_2$ | Transfer data block into first part of input buffer memory 431 of unit "*a*." |
| 4402*a* | $d_2$ | Transfer data block into second part of input buffer memory 431 of unit "*a*." |
| 4410*a* | $d_2$ | Print contents of input buffer memories 431 in unit "*a*." |
| 4411*a* | $d_1$ | Shift paper in unit "*a*" by one line. |
| | | Operation of punched card reader "*a*" (code 45 . . . *a*) |
| 4510*a* | $d_1$ | In unit "*a*" reset to zero the output buffer memory 432, pass the following punched card and read it into the output buffer memory 432. |
| 4511*a* | $d_4$ | The same as operation 4510*a*, when feeding last punched card signal fulfillment of this condition to central unit modules. |
| 4501*a* | $d_3$ | Transmit contents of first part of output buffer memory 432 in unit "*a*". |
| 4502*a* | $d_3$ | Transmit contents of second part of output buffer memory 432 in unit "*a*." |

The first column of Table C indicates examples of codes causing the operation of the peripheral memory unit, as described in the third column of the table. The second column of the table indicates for each operation the type of the operational part of the instruction in the central unit module 1 (FIG. 1) which initiates the required cooperation of the central unit module 1 in the course of the operation. The various symbols appearing in this column of Table C have the following meaning:

$d_1$—the operation is effected without cooperation of the central unit module 1 (apart from the actual initiation of operation by means of the OMEGA-signal), $d_2$—the central unit module 1 has to transmit a data block to the data output bus 55, $d_3$—the central unit module 1 has to accept the data block from the data input bus 65, $d_4$—the central unit module 1, having initiated the operation, responds to the condition transmitted through the condition transmitting bus 66.

The following Table D shows the conditions for the operation of the blocking gate 414 (FIG. 2) for the same exemplary embodiments of the peripheral unit module 4, as are shown in Table C.

TABLE D

[An example of conditions for the operation of the blocking gate 414]

| Address part of instruction | Condition for transmitting a return signal into OMEGA-return signal bus 64 |
|---|---|
| | For magnetic tape memory "*a*" |
| 4200*a* | |
| 4210*a* | |
| 4201*a* | Tape at rest. |
| 4211*a* | |
| 4202*a* | |
| 4212*a* | |
| 4203*a* | Recroding of contents of input buffer memory 431 on the tape is terminated. |
| 4205*a* | Output buffer memory 432 filled. |
| | For line printer "*a*" |
| 4401*a* | No conditions. |
| 4402*a* | |
| 4410*a* | Printer at rest (preceding action terminated). |
| 4411*a* | |
| | For punched card reader "*a*" |
| 4510*a* | No conditions. |
| 4511*a* | |
| 4501*a* | Output buffer memory 432 filled. |
| 4502*a* | |

The first column of the above Table D shows the operation of the peripheral unit module 4 (same code as in Table C). The second column shows the condition, the fulfillment of which causes the blocking gate 414, after arrival of a signal through the bus 419 (FIG. 2), to transmit an OMEGA-return signal through the OMEGA-return signal branch 642. If the given condition is not fulfilled, the blocking gate 414 will transmit an OMEGA-blocking signal through the OMEGA-blocking signal branch 632, after arrival of a signal through the bus 419.

At the moment that the condition indicated in the second column of Table D is fulfilled, the peripheral module control unit 42 (FIG. 2) transmits a signal through the bus 423, by means of which signal the program block memory 416 is reset to zero, provided that this memory has been previously actuated. This terminates the signal transmitted to the program block bus 61 from this peripheral unit module.

The transmission of a priority signal through the program priority branch 621 from the control unit 42 for that program to which the peripheral unit module 4 has been allotted by the program number selector 411, is, in the foregoing examples, dependent upon the following conditions:

In a magnetic tape memory, the priority signal is transmitted (1) After the operation 4203*a*, when the input buffer memory 431 is emptied and the tape is still in motion, (2) after the operation 4205*a*, when the output buffer memory 432 is filled and the tape is still in motion.

In the line printer, the priority signal is emitted in the course of a predetermined time interval after termination of the instruction 4501*a* or 4502*a*.

In the punched card reader the priority signal is transmitted, as soon as the output buffer memory 432 is filled, as long as the card feeder is still in motion.

These conditions for emitting the priority signals are chosen, for instance, such that these signals are emitted in those intervals of operation of the peripheral unit modules, during which an uninterrupted operation of said peripheral unit module is achieved by supplying a new instruction at the right time from the central unit module 1 (FIG. 1), with the result that the relatively long periods, necessary for starting or stopping the mechanical parts of the peripheral unit modules, are eliminated.

(A3) *Auxiliary memory module 3*

Apart from the peripheral unit modules 4/1, 4/2 etc. (FIG. 1), which before being started must definitely be assigned to one of the programs by means of the program number selector 411 (FIG. 2), it is possible as parts of the new data processing system also such auxiliary memory modules as are assigned automatically to the various programs, as required during operation.

(A3.0) *Block diagram of the auxiliary memory module*

An exemplary embodiment of an auxiliary memory module intended for a plurality of programs is shown in the block diagram according to FIG. 3, illustrating by way of example a high-capacity auxiliary memory module 3, comprising a discriminating circuit 31, a control unit 32, a proper memory unit or auxiliary memory unit 33, an address switch 34 and an address switch governing unit 35.

The auxiliary memory discriminating block 31 comprises a selector circuit 310, a blocking gate 311, an initiating decision circuit 312, an allotting circuit 313, a program number memory 314, OR-gates 315 and 317, a program block memory 316 and a priority signal emitter 318.

The proper memory block (auxiliary memory unit) 33 comprises, for instance, a system of high-capacity drum memories, with the respective electronic circuits, and is equipped, in particular with an input buffer memory 331 and an output buffer memory 332.

The auxiliary memory module 3 is connected to the various lines of the output connecting channel 5, as well as the input connecting channel 6. The synchronizing branch 512 of the synchronizing bus 51 leads to the auxiliary memory module 3 and connected thereto are all partial circuits of the auxiliary memory module 3, which have to operate in synchronism with the central unit module (FIG. 1).

The address bus 52 is provided with an address branch 522, leading to the selector circuit 310, with a branch 523 leading to the initiating decision circuit and with a branch 524 leading to the address switch 34. From the program bus 53 a program branch 532 leads to the blocking gate 311, to the program number memory 314, to the program block memory 316 and, finally, a branch 533 to the address switch 34. An OMEGA-signal branch 542 of the OMEGA-signal bus 54 leads to the selector circuit 310. From the data output bus 55 an output branch 552 leads to the proper memory or auxiliary memory unit 33 and is there connected to the input buffer memory 331. The auxiliary memory module 3 is attached to the various lines of the input connecting channel in the following way:

A program block branch 612 of the program block memory 316 is attached to the program block bus 61, a program priority branch 622 of the priority signal emitter 318 is connected to the program priority bus 62, an OMEGA-blocking signal branch 633 of the OR-gate 315 is attached to the OMEGA-blocking signal bus 63, an OMEGA-return signal branch 643 of the OR-gate 317 is attached to the OMEGA-return signal bus 64 and a data branch 655 of the output buffer memory 332 is connected to the data input bus 65.

The auxiliary memory module 3 is also directly connected to the central unit module 1 (FIG. 1) through a bus 102 feeding a signal from the organisation control unit (FIG. 1) to the allotting circuit 313 and through another bus 103, transmitting a signal relating to a deviation of the address from the allotted limits, from the address switch 34 via the proper memory or auxiliary memory unit 33 to the organisation control unit 11 (FIG. 1).

The selector circuit 310 is connected further, by means of a connection 3101, to the blocking gate 311. The latter is connected by means of a connection 3111 to the program number memory 314, through a connection 3102 to the initiating decision circuit 312 and through a connection 3103 to the OR-gate 315. The initiating decision circuit 312 is further connected, by means of a connection 3104 and a connection 321 to the auxiliary memory control unit 32, through a connection 3105 to the OR-gate 317 and through a connection 3106 to the OR-gate 315.

The allotting circuit 313 is further connected, by means of a connection 3107, to the OR-gate 315, by connections 3108a and 3108b to the OR-gate 317 and to the auxiliary memory control circuit 32, by means of connections 3109 and 3110 to the program number memory 314. The latter is also connected, by means of the connection 3111, to the program block memory 316 and to the priority signal emitter 318 and, by means of the connection 324, to the auxiliary memory control circuit 32.

The program block memory 316 is further connected, by means of the OMEGA-blocking signal branch 633, to the OR-gate 315 and, by means of connections 323 and 324 to the auxiliary memory control circuit 32. The priority signal emitter 318 is likewise connected, by means of the connection 323, to the auxiliary memory control circuit 32.

The control circuit 32, through connections 322 and 333, is connected to the proper memory block 33 and, through a connection 325, to the address switch 34. The governing block 35 is connected by means of a connection 342 to the address switch 34, which is also connected by means of a connection 341 to the proper memory unit 33, to which a branch of the connection 342 is also connected.

(A3.1) *Operation of the auxiliary memory module*

The auxiliary memory module 3 cooperates with the central unit module 1 (FIG. 1), when solving the five problems according to five independent programs. Before starting to solve any of the problems, it is necessary to assign to its program a certain section of the auxiliary memory module 3, which operation is effected by the governing unit 35 of the address switch. The actual operation of the address switch 34 is analogous to the operation of the address switch 23 (FIG. 1) of the working memory module 2 (FIG. 1). During the solving operation, the auxiliary memory module 3 is controlled by instructions from the central unit module 1. There are two types of such instructions; preparatory instructions and executive instructions.

The execution of the preparatory instruction is initiated by a specific signal on the bus 102. When the preparatory instruction is executed, the auxiliary memory module 3 is thereby assigned to one of the five programs and remains assigned thereto until released, due to any of the executive instructions. The executive instruction is analogous to instructions controlling the operation of the peripheral unit modules 4 for one program. The following Table E shows, by way of example, a set of instructions in the event that the magnetic drum memory is constituted by an auxiliary memory module 3 according to the invention.

TABLE E

| Address part of instruction | Type of instruction | Description of operation initiated by this instruction in the auxiliary memory module |
|---|---|---|
| $x$ | $c_1$ | Prepare successive data recording from the input buffer memory to the drum memory, beginning with address $x$ in drum memory. |
| $x$ | $c_2$ | Prepare successive reading of data from the drum memory to output of buffer memory 332, beginning with address $x$ in drum memory. |
| 41010 | $d_1$ | Transfer data block from the central unit module to input buffer memory 331 and initiate their recording in drum memory. |
| 41020 | $d_3$ | Transmit data block from output buffer memory 332 to central unit module and initiate reading of additional data from drum memory into output buffer memory 332. |
| 41000 | $d_1$ | Terminate present operation of drum memory. |

The above table shows a set of instruction for the auxiliary drum memory. The first two instructions are preparatory ones, the remaining three are executive instructions. Symbols used to denote the type of instructions are identical with those used in Table C. The symbol "$s$" denotes instructions, which are fully specified by their operational parts (see section A1.0 of present disclosure), i.e., either $c_1$ or $c_2$ instructions.

(A3.10) *Preparatory instruction* $c_1$

Upon occurrence of an instruction "$c_1$," the organisation control unit 11 (FIG. 1) emits a specified pulse through the bus 102 to the allotting circuit 313. Two alternatives are then possible:

(a) If, at this moment, the auxiliary memory module 3 has already been assigned to any of said five programs which have to be solved, the program number memory 314 signals this fact, through the connection 3110, and the allotting circuit 313 emits, through the connection 3107, via the OR-gate 315 and the OMEGA-blocking signal branch 633, a signal to the OMEGA-blocking signal bus 63 as well as to the program block memory 316, in order to block that one of said five programs, whose number is simultaneously signalled to the program block memory 316 through the program branch 532 of the program bus 53. The blocking of individual programs is signalled from the program block memory 316 over the program block branch 612 to the program block bus 61.

(b) If, at the moment, the auxiliary memory module 3 is not assigned to any of the five programs to be solved, which fact is also transferred to the allotting circuit 313 from the program number memory 314 via the connection 3110, the alloting circuit 313 emits, through the connection 3109, a signal to the program number memory 314 and, through the connection 3108a, a signal to the OR-gate 317 and to the auxiliary memory control circuit 32. In the program number memory 314 the program number, signalled by the program branch 532, is retained and this number is then continually emitted by the connection 3111. The signal from the connection 3108a proceeds through the OR-gate 317 via the OMEGA-return signal branch 643 to the OMEGA-return signal bus 64 to the central unit module 1 (FIG. 1). The auxiliary memory control circuit 32 operates, on the basis of the signal arriving from the connection 3108a, in such a way that (ba) The address "$x$" from the address bus 52 is transformed in the address switch 34 into an effective address "$x'$," which proceeds through the bus 341 to the proper memory block 33. At the same time the address is checked, as to whether or not it deviates from the limits set by the governing block 35 and a deviation, if any, is signalled through the bus 103 to the organisation control unit 11 (FIG. 1).

(bb) The continuous signal on the bus 323 initiates in the priority signal emitter 318 the emission of a priority signal through the program priority branch 622 to the program priority bus 62, i.e., for that program, whose number has been signalled through the connection 3111 from the program number memory.

(bc) The auxiliary memory control circuits 32 are prepared for a sequential recording of data arriving from the input buffer memory 331 to the effective address $x'$, as soon as said data are supplied to the input buffer memory 331 (by means of an instruction 41010—see further disclosure).

(A3.11) *Preparatory instruction* $c_2$

Upon the occurrence of an instruction $c_2$ the organisation control unit 11 (FIG. 1) transmits, also through the bus 102, a correspondingly specified impulse to the allotting circuit 313. The continued operation of the auxiliary memory module 3 is analogous as in the event of the instruction $c_1$, with the following differences:

(ad b) The signal from the alloting circuit 313 to the auxiliary memory control circuit 32 and to the OR-gate 317 proceeds along the connection 3108b.

(ad bb) The transmission of the priority signal from the priority signal emitter 318 is initiated by a signal on the bus 323 from the auxiliary memory control circuit 32, but not until the moment when the output buffer memory 332 is filled with data.

(ad bc) The auxiliary memory control circuits 32 are prepared for sequential data reading, beginning with the address $x'$ into the output buffer memory 332, said reading being initiated as soon as the given address is available. After the output buffer memory 332 has been filled, the reading of data from subsequent addresses is prepared.

(A3.12) *Executive instructions*

Upon the occurrence of $d_2$-type instructions having an address part 41010 or $d_3$-type instructions having an address part 41020 or $d_1$-type instructions having an address part 41000, the organisation control unit 11 (FIG. 1) emits a signal to the OMEGA-signal bus 54. This signal also proceeds through the OMEGA-signal branch 542 to the selector circuit 310, into which the address part of the instruction from the address bus 52 is supplied through the address branch 522.

If the type and number of the peripheral unit module, provided by the address part, coincide with the type and number of the auxiliary memory module 3 (as provided, for example, by the two highest orders of the address part, i.e., in this case, 41), the selector circuit 310 emits, along the connection 3101, a signal to the blocking gate 311. This pulse causes in the blocking gate 311 the number of the program in effect (to which the instruction 41010 or 41020 or 41000 belongs) transferred by the program branch 532 from the program bus 53, to be compared in the blocking gate 311 with the number of the program, to which the auxiliary memory module 3 is assigned at the selected moment and which is transferred along the connection 3111 from the program number memory. In case of nonequivalence of these two program numbers, the blocking gate 311 emits a signal to the connection 3103. This signals passes through the OR-gate 315 and OMEGA-blocking signal branch 633 on the one hand to the OMEGA-blocking signal bus 63 and, on the other hand, to the program block memory 316, where it initiates the blocking of the running program in effect by means of a signal 612 emitted from the program block branch 612 to the program block bus 61.

In case of agreement of both program numbers, the blocking gate 311 emits a signal along the connection 3102 to the initiating decision circuit 312. Three lower orders of the address part are introduced into the circuit 312 by the branch 523 from the address bus 52, said three lower orders determining the required operation of the auxiliary memory module 3. The circuit 312 determines first, whether or not the required operation can be executed on the basis of the following conditions:

(a) The operation 010 is executable, if the auxiliary memory control circuits 32 are prepared for successive recording of data (instructions $c_1$) and, if the input buffer memory 331 is available.

(b) The operation 020 is executable, if the auxiliary memory control circuits 32 are prepared for successive reading of data (instructions $c_2$) and, if the output buffer memory 332 is filled.

(c) The operation 000 is always executable.

Signals required for the decision regarding the executability of the operation, are fed to the initiating decision circuit 312 from the auxiliary memory control circuit 32 through the bus 321.

If the required operation is not executable, the initiating decision circuit 312 transmits a signal through the connection 3106 via the OR-gate 315 and OMEGA-blocking signal branch 633, on the one hand to the OMEGA-blocking signal bus 63, and, on the other hand, to the program block memory 316, where it initiates the blocking of the program in effect by means of a signal fed from the program block branch 612 to the program block bus 61.

If the operation is executable, the initiating decision circuit 312 emits a signal through the connection 3105 via the OR-gate 317 and OMEGA-return signal branch 643 to the OMEGA-return signal bus, in order to initiate further cooperation of the central unit module 1 (FIG. 1) in carrying out the instruction. The actual execution of the operation in the auxiliary memory module 3 is initiated by the initiating decision circuit 312 by a specified signal transmitted through the connection 3104 to the auxiliary memory control circuit 32. Additional procedure depends upon the type of operation.

(a) For the operation 010, the auxiliary memory control circuit 32 initiates the reception of data transmitted from the central unit module 1 (FIG. 1) through the data output bus 55 and output branch 552 to the input buffer memory 331 and, thereupon, their recording on the respective address (the respective address is either the address *x'* or the address following after the address of the last recording). As long as the input buffer memory 331 is occupied, the auxiliary memory control circuit 32 interrupts, by means of the bus 323, the transmission of the priority signal from the priority signal emitter 318.

(b) For the operation 020, the auxiliary memory control circuit 32 initiates the transmission of data from the output buffer memory 332 through the data branch 655 to the data input bus 65, whence such data is received by the central unit module 1 (FIG. 1). Having transmitted the data, the auxiliary memory control circuit 32 initiates a new filling of the output buffer memory 332 with data read from the respective address, which follows after the address of the last reading. For the period during which the output memory buffer 332 is not filled with data, the auxiliary memory control circuit 32 interrupts, by means of the bus 323, the emission of the priority signal from the priority signal emitter 318.

(c) For the operation 000, the control circuit 32 brings all its inner circuits, as well as circuits of the proper memory block 33, to their state of rest. By means of a signal on the bus 324 the program number memory 314, as well as the program block memory 316, are fully zeroed or reset. In this manner, the entire auxiliary memory module 3 is brought into a state, in which it can be claimed by any of the aforementioned five programs to be solved, by means of suitably prepared instructions.

When renewing the priority signal fed through the bus 323 from the auxiliary memory control circuit 32, when executing operations 010 and 020, that program unit will be set to zero simultaneously in the program block memory 316, to which the auxiliary memory module 3 has most recently been assigned and whose number has been retained in the program number memory 314. This measure results in the cancellation of the blocking of the program, which has been caused by a premature arrival of the instruction for the operation 010 or 020. The blocking, if any, of the other programs in the program block memory 316 remains unchanged.

During the actual execution of operations 010 and 020, a check is made in the proper memory unit 33 to determine whether or not a certain address in the auxiliary memory module 3 has deviated from the limits set by the governing block 35 of the address switch. A deviation, if any, is signalled through the bus 103 to the organization control unit 11 (FIG. 1).

DETAILED DESCRIPTION OF AN EXEMPLARY EMBODIMENT

(B.0) Introduction

The following disclosure is a detailed description of an exemplary embodiment of the modular data processing system of the present invention. The description is directed to those parts and circuits of the system which are essential for the disclosed example.

In this example, the central unit module 1 (FIG. 1) is constituted by a digital computer, substantially of the series-parallel type, operating in the decimal system. The words, i.e., numbers and instructions, each have thirteen decimal figures, each of which is represented, for example, by a signal on five buses or by the condition or state of five memory elements in a so-called "two of five" code. The control unit 12 (FIG. 1) comprises a synchronizing pulse generator 121. The pulses are fed to all parts of the central unit module and further, by the synchronizing bus 51 which is part of the output connecting channel 5, to all peripheral unit modules 4/1, 4/2, 4/3, etc., as well as the auxiliary memory module 3.

The cycles and periods are defined in the whole system by the synchronizing pulses. A period is the time required for representing one bit on one bus or for representing one digit on five buses. A cycle consists of 13 periods and it is the time required for representing 13 bits on one bus or one word on five buses. The individual periods of a cycle correspond to the individual decimal orders of a number. The periods of one cycle, following one another in a time sequence, are indicated as follows: *aa, bb, cc, dd, ee, ff, gg, hh, ii, jj, kk, ss, rr*.

(B1) *Arithmetical and auxiliary registers*

The arithmetical registers 14 (FIG. 1) comprise two registers, each having a capacity of one word, in which the result of the operation is retained after its termination, the same having, if required, double the number of digits.

The auxiliary registers 15 comprise nine registers, each with a capacity of one word, one of which serves as a so-called "counting register," in which, after the operation is terminated, the address of the following instruction is stored. The auxiliary registers are also utilized for various address modifying operations, as a high-speed working memory, etc. Each of the arithmetic, as well as auxiliary registers 14 and 15, respectively, is provided with a corresponding backing register 141 or 151, each register for one word having its backing register for five words. The five words of the backing register correspond to five independent programs to be solved in parallel. The proper registers and backing registers substantially comprise delay lines (such as ultrasonic lines) of the feedback type.

(B1.0) *Block diagram of register*

A block diagram of one register with a backing register is shown in FIG. 4. The register, 140, comprises governing circuits, constituted by an OR-gate 147 and inverting circuits 148 and 149 and five identical register circuits 143/1, 143/2, 143/3, 143/4 and 143/5.

Input buses or lines 144/1, 144/2, 144/3, 144/4 and 144/5 supply numbers to the register circuits. The numbers are derived from the register circuit via a five-way output bus, consisting of lines 145/1, 145/2, 145/3, 145/4 and 145/5. The register 140 is also connected to the governing buses 146, 1149 and 1147. The governing bus 146, together with a branch of the connection 1149, leads to the OR-gate 147, whose output is connected to the inverting circuit 148. The output bus 150 of the inverting circuit 148 leads to all five register circuits 143/1 to 143/5.

The governing conductor 1149 leads is also connected to all five register circuits 143/1 to 143/5. The governing conductor 1147 leads, on the one hand, to all five register circuits 143/1 to 143/5 and, on the other hand, to the inverting circuit 149, whose output bus 1490 leads also to all five register circuits. The internal wiring of all five register circuits 143/1 to 143/5 is fully indentical and, in FIG. 4, the circuit 143/1 only is shown in detail. The register circuit 143/1 (and 143/2 to 143/5) comprises a short delay line 1400/1 having a capacity of 13 bits, a long delay line 1407/1 having a capacity of 65 bits, OR-gates 1402/1 and 1405/1 and AND-gates 1401/1 1403/1, 1404/1 and 1406/1. The short delay line 1400/1 is connected to the output bus 145/1, which is connected to the circuit 143/1 to the AND-gates 1401/1 and 1404/1. The AND-gate 1401/1 is controlled by the bus 150, its output leading to the OR-gate 1402/1, to the output of which the short delay line 1400/1 is attached. The AND-gate 1404/1 is controlled by the governing conductor 1147, its output being connected to the OR-gate 1405/1, to the output of which the long delay line 1407/1 is connected. The output of the long delay line 1407/1 leads, on the one hand, to the gate 1403/1 and, on the other hand, to the AND-gate 1406/1. The gate 1403/1 is controlled by the governing conductor 1149 and its output leads to the OR-gate 1402/1. The AND-gate 1406/1 is controlled by the bus 151 and its output is connected to the OR-gate 1405/1.

(B1.1) *Operation of the register*

The register 140 performs three operations:

(a) Insertion of number into the register
(b) Storing of number
(c) Ranging of number When inserted, the number is introduced into the register during one cycle in the form of a series of pulses on the input buses 144/1 to 144/5. During the same cycle, a signal is supplied via the bus 146; said signal having been transferred by the OR-gate 147 and having been inverted in the inverting circuit 148, causes the AND-gates 1401/1 to 1401/5 to close. The signals on the input buses 144/1 to 144/5 are transferred via the OR-gates 1402/1 (to 1402/5) to the delay lines 1400/1 (to 1400/5). The number having been inserted into the short delay lines, the signal on the input buses 144/1 to 144/5, as well as the signal on the governing bus 146 are terminated. The AND-gates 1401/1 (to 1401/5) are thus opened, and the feedback from the outputs 145/1 of the short delay lines via the OR-gates 1402/1 (to 1402/5) to the inputs of the short delay lines 1400/1 (to 1400/5) is thereby introduced. The inserted number remains stored in the short delay lines 1400/1 (to 1400/5), whence it is transferred in each cycle through the buses 145/1, but is reintroduced to said buses due to the feedback via the AND-gates 1401/1 (to 1401/5) and OR-gates 1402/1 (to 1402/5).

When the number is stored, a control signal in the length of one cycle is supplied via the connection or conductor 1147. This signal opens the AND-gates 1404/1 (to 1404/5) and simultaneously the AND-gates 1406/1 (to 1406/5) are closed. The number derived from the short delay lines 1400/1 (to 1400/5) proceeds through the AND-gates 1404/1 (to 1404/5) and is introduced via the OR-gates 1405/1 (to 1405/5) to the long delay lines 1407/1 (to 1407/5). After termination of the control signal on the conductor 1147, the AND-gates 1404/1 (to 1404/5) are closed and the AND-gates 1406/1 (to 1406/5) are reopened, whereby the feedback circuits of the long delay lines 1407/1 (to 1407/5) are closed and the stored number remains in these lines. Altogether five words may be stored in this way in the long delay lines 1407/1 (to 1407/5).

When ranging a number, the control signal in the length of one cycle is supplied via the conductor 1149. The control signal closes the OR-gate 147, inverting circuit 148 and the AND-gate 1401/1 (to 1401/5) and simultaneously opens the AND-gate 1403/1 (to 1403/5). The number derived from the long delay lines 1407/1 (to 1407/5) in this cycle is thereby introduced into the short delay lines 1400/1 (to 1400/5). After termination of the control signal on the conductor 1149, the AND-gates 1401/1 (to 1401/5) are reopened, whereby the feedback is renewed and the number, transferred from the delay long lines to the short delay lines, remains stored therein. The selection of one from five numbers, circulating in the long delay lines 1407/1 (to 1407/5) is provided in the cycle in which, during the ranging of the number, the control signal is supplied via the conductor or line 1149.

(B2) *Control register*

The control register 16 (FIG. 1) is operated substantially as a static shift register having the capacity of one word and serving for retaining the instruction which is just being executed. It comprises the proper control register equipped with the backing register 161 (FIG. 1) having a five word capacity, and auxiliary and decoding circuits, etc.

(B2.0) *Block diagram*

FIG. 5 shows a block diagram representing the arrangement of the proper control register with the backing register. The register 162 with the backing register 161 comprises control circuits consisting of an OR-gate 166, inverting circuit 167 and five identical register circuits 16/1 to 16/5.

A five-way input channel is provided composed of buses 163/1 to 163/5 to supply instructions to the register. The instruction may be derived from the register series-parallel through a five-way output channel composed of buses 164/1 to 164/5. The instruction retained in the register is moreover represented by signals on the parallel output bus 160. The register 162 is also connected to control buses or conductors 165, 1147 and 1149. The control bus 165 is connected to the OR-gate 166. The governing conductor 1147 is also connected to the OR-gate 166, to all the register circuits 16/1 to 16/5 and to the inverting circuit 167. The governing conductor 1149 is connected to the OR-gate 166 and to all the register circuits 16/1 to 16/5.

The output bus 168 connected to the OR-gate 166 and the output bus 169 connected to the inverting circuit 167, are both extended to all the register circuits 16/1 to 16/5. The internal wiring of all five register circuits 16/1 to 16/5 is entirely identical and, for this reason, the circuit 16/1 only is shown in detail in FIG. 5.

The register circuit 16/1 contains a static shift register 1600/1 having a capacity of 13 bits, a long delay line 1604/1 having a capacity of 65 bits, OR-gates 1606/1 and 1602/1 and further AND-gates 1601/1, 1603/1 and 1605/1.

The series input of the shift register 1600/1 is connected to the output of the OR-gate 1606/1. The series output 164/1 of the shift register 1600/1 is connected to the AND-gate 1601, which is connected to the govrening conductor 1147. The output of the AND-gate 1601/1 is connected to the OR-gate 1602/1. The parallel output 160/1 of the shift register 1600/1 forms part of the parallel output bus 160.

The shift register 1600/1 is also connected to the governing bus 168. The output of the OR-gate 1602/1 is connected to the input of the long delay line 1604/1. The output of the long delay line 1604/1 is connected to the AND-gate 1605/1 and to the AND-gate 1603/1. The AND-gate 1603/1 is controlled by the bus 169 and its output is supplied to the OR-gate 1602/1. The AND-gate 1605/1 is governed by the conductor 1149 and its output is connected to the input of the OR-gate 1606/1. The bus or line 163/1 of the input channel is connected to the input of the OR-gate 1606/1.

(B. 21) *Operation of the register*

The register 162 performs the following three operations:

(a) Insertion of instruction into the register.
(b) Storing of the instruction.
(c) Ranging of the instruction.

The instruction is supplied to the register during the period of one cycle in the form of a series of pulses appearing on the input buses 163/1 to 163/5. A signal is provided in the bus or line 165 in the same cycle and is supplied through the OR-gate 166 the and bus 168 to the shift register 1600/1 (to 1600/5). This signal initiates a shift of the contents of the shift regitsers 1600/1 (to 1600/5), with the result that they receive the instruction supplied by the input buses 163/1 to 163/5 through the OR-gates 1606/1 (to 1606/5). After termination of the cycle, the instruction remains stored in the static shift registers 1600/1 (to 1600/5) and is represented by signals on the parallel output bus 160.

When the instruction is being stored, a control signal having length of one cycle is supplied via the conductor 1147. This signal opens the AND-gates 1601/1 (to 1601/5) and the bus 169 causes the AND-gates 1603/1 (to 1603/5) close via the inverting circuit 167, and the bus 168 initiates a shift of the contents of the shift registers 1600/1 (to 1600/5). The contents of the shift registers 1600/1 (to 1600/5) are supplied via buses 164/1 (to 164/5) and via the AND-gates 1601/1 (to 1601/5) and OR-gate (1602/1 to 1602/5) to the long delay lines 1604/1 (to 1604/5). The signal on the conductor 1147 having been terminated, the signal on the bus 169 is renewed, whereby the AND-gates 1603/1 (to 1603/5) are opened and the feedback circuits of the long lines 1604/1 (to 1604/5) are thus closed. The instruction, stored in the shift registers 1600/1 (to 1600/5), is thereby transferred to the long delay lines 1604/1 (to 1604/5), where it remains stored. Altogether five instructions may thus be stored in the long delay lines 1604/1 (to 1604/5).

When the instruction is ranged, a control signal having a length of one cycle, is supplied via the conductor 1149. This signal opens the AND-gates 1605/1 (to 1605/5) and, via the OR-gate 166 and bus 168, initiates a shift of the contents of the shift registers 1600/1 (to 1600/5). The instruction derived from the long delay lines 1604/1 (to 1604/5) in this cycle is transferred through the AND-gates 1605/1 (to 1605/5) and OR-gates 1606/1 (to 1606/5) and is supplied to the shift registers 1600/1 (to 1600/5), where it remains stored on the conductor 1149, after termination of the control signal. The selection of one of the five instructions circulating in the long delay lines 1604/1 (to 1604/5) is provided in the cycle in which the control signal is supplied via the conductor 1149 when the instruction is being ranged.

(B3) Organisation control unit

A block diagram of the organisation control unit 11 is shown in FIGS. 6 and 7, considered together. The block diagram of the organisation control unit 11, as shown, comprises program in effect memory 1101, coincidence circuits 1102 and 1103, a program starting memory 1104, inverters 1105, 1107, OR-gates 1106, 1117, a comparator 1108, a starting circuit 1109, a stopping circuit 1110, a decision gate 1111, a clearing circuit 1112, OR-gates 1113 and 1115, a ranging circuit 1114 and an output gate 1116.

The input of the program in effect memory 1101 is connected to a five-way bus 1123 which is part of the bus 107 connected from the control unit 12 (FIG. 1) and also connected to the coincidence circuit 1103 and to the comparator 1108. The output of the program in effect memory 1101 comprises the program bus 53, which in the organisation control unit is connected to the output control bus 105, to the OR-gate 1117, to the coincidence circuits 1102 and 1103, to the program starting memory 1104 and to the comparator block 1108. The running program memory 1101 is connected to the governing conductor 1145 leading from the clearing circuit 112 and to the conductor 1149 leading from the ranging circuit 1114.

The coincidence circuit 1102 is also connected to the five-way bus 1122, which is part of the bus 104 from the manual control unit 18 (FIG. 1) and which is connected to the program starting memory 1104 and to the comparator 1108. The output bus 1133 of the coincidence circuit 1102 is connected to the starting circuit 1109.

The output bus 1134 of the coincidence circuit 1103 is connected to the clearing circuit 1112.

The output of the program starting memory 1104 comprises a five-way bus 1121, which is part of the governing bus 1105 connected to the signalling unit 17 (FIG. 1) and which is also connected the inverter 1105. The program starting memory 1104 is connected to the governing conductor 1147 from the starting circuit 1109 and to the governing conductor 1142 leading from the decision gate 1111.

The five-way output 1119 from the inverter 1105 is connected to the OR-gate 1106, which is connected to the five-way program block bus 61.

The five-way output 1124 of the OR-gate 1106 is part of the bus 105 and is also connected to the inverter 1107. The five-way output 1120 from the inverter 1107 is connected to the comparator 1108. The latter is connected to a five-way bus 1125, which is part of the control bus 104 connected to the manual control unit 18 (FIG. 1). The program priority bus 62 is connected to the comparator 1108. The program priority bus 62 is part of the input connecting channel 6 (FIG. 1).

The comparator 1108 is connected to the governing conductor 1136 from the starting circuit 1109 and the governing bus 1148 from the ranging circuit 1114.

The governing conductor 1152 from the comparator 1108 is connected to the decision gate 1111 and the conductor 1153 is connected to the ranging circuit 1114.

The starting circuit 1109 is connected to the bus 1126 for the transmission of the starting signal and to the bus 1127 for the transmission of the stopping signal. Both buses 1126 and 1127 are part of the connection 104 from the manual control unit 18 (FIG. 1). The starting circuit 1109 is connected to a conductor 1135 from the OR-gate 1117 and a conductor 1146 from the ranging circuit 1114. Connected to the starting circuit 1109 are governing conductors 1137 and 1136, a conductor 1138 connected to the OR-gate 1113 and a conductor 1139 connected to the stopping circuit 1110.

The stopping circuit 1110 is connected to the bus 206 leading from the working memory module 2 (FIG. 1) to the bus 103 leading from the auxiliary memory module 3 (FIG. 1) to conductors 1128, 1129 and 1130, which are parts of the bus 107 leading from the control unit 12 (FIG. 1) and to the conductor 1147 leading from the decision gate 1111. The governing conductors 1140 and 1141 are connected from the stopping circuit 1110 to the decision gate 1111. The stopping circuit 1110 is connected to the signalling block 17 (FIG. 1) via the conductor 1158 which is part of the bus 105.

The decision gate 1111 is connected to conductors 1131 and 1132 which are parts of the bus 107 leading from the manual control unit 18 (FIG. 1) and to the OMEGA-blocking signal bus 63, which is part of the input connecting channel 6 (FIG. 1). A conductor 1143 is connected from the decision gate 1111 to the clearing circuit 1112 and a conductor 1144 is connected to the OR-gate 115.

A conductor 1145 from clearing circuit 1112 is connected to the OR-gate 1113 and to the program in effect memory 1101 and a conductor 1147 which is part of the control bus 101 (FIG. 1) is also connected to such memory.

The ranging circuit 1114 is further connected to the output 1152 of the OR-gate 1113. A conductor 1150 is connected from the ranging circuit 1114 to the OR-gate 1115 and a conductor 1149, which apart from controlling the program in effect memory 1101 is part of the control bus 101, extends from the organisation control unit 11 (FIG. 1).

The output gate 1116 is connected to the output 1151 of the OR-gate 1115 and is also connected to the bus 110 from the control register 16 (FIG. 1). The bus is connected from the output gate 1116 to the control unit 12 (FIG. 1), the bus 102 is connected to the auxiliary memory module 3 (FIG. 1) and the OMEGA-signal bus 54 which is part of the output connecting channel 5 (FIG. 1).

(B3.10) Program memory

The program in effect memory 1101 is shown in the block diagram illustrated in FIG. 8. It comprises a governing inverter 11015 and five memory circuits 1101/I to 1101/V. Each memory circuit (1101/I to 1101/V) is connected to one of the conductors 1123/I to 1123/V of a five way line and each circuit is connected to the governing conductor 1149 and to the output of the governing inverter 11015. The input of the inverter 11015 is connected to the governing conductor 1145. One conductor 53/I to 53/V of the program bus 53 is connected from each of the memory circuits 1101/I to 1101/V. All memory circuits 1101/I to 1101/V are identical. FIG. 8 shows in detail the circuit 1101/I.

The circuit 1101/I comprises a delay circuit (e.g., dynamic flip-flop) 11011, an OR-gate 11012 and two AND gates 11013 and 11014. The delay circuit 11011 is an electronic circuit wherein each pulse fed to its input during one period appears at its output in the following period. The delay circuit thus produces a delay of the pulse sequence fed to its input, by one period.

Due to a signal appearing at both inputs of the AND-gate 11013, the signal is transferred through the OR-gate 11012 to the delay circuit 11011, whence it is transferred, one period later, to the bus 53/I. If there is no signal on the conductor 1145, the AND-gate 11014 is permanently open, due to the operation of the inverter 11015, with the result that the pulse from the output 53/I is transferred through the OR-gate 11012 back to the input of the delay circuit 11011. This operation is repeated even if a signal is no longer supplied from the AND-gate 11013. There is permanently a "one" signal ("I" signal) at the output 53/I. The program in effect memory 1101 transmits the program number "IL." The other memory circuits 1101/I to 1101/V operate in an analogous way. All memory circuits 1101/I to 1101/V are reset or zeroed by a signal in the conductor 1145. A signal on the governing conductor 1149 switches to the "one" state the memory circuit determined by the simultaneous "one" signal on the respective conductor 1123/I to 1123/V.

(B3.11) Coincidence circuits

The coincidence circuit 1102 is shown in FIG. 9. It comprises an OR-gate 11021 and five AND-gates 1102/I to 1102/V. Each of the AND-gates is connected to one of the conductors 1122/I to 1122/V of a five-way bus 1122 (each of said conductors being identified by a corresponding Roman numeral) and to one of the conductors 53/I to 53/V of the program bus 53 (said conductors being also identified with corresponding Roman numerals). The outputs of all the AND-gates 1102/I to 1102/V are connected to the OR-gate 11021, to which the output 1133 is connected. At the output 1133 of the coincidence circuit 1102 a "one" signal is produced only then if there are "one" signals on corresponding conductors of buses 53 and 1122.

The coincidence circuit 1103 is shown in FIG. 10. It comprises an OR-gate 11031 and five AND-gates 1103/I to 1103/V. The wiring and operation of the coincidence circuit 1103 is analogous to that of the coincidence circuit 1102. At the output 1134 of the coincidence circuit 1103 a "one" signal is produced only if there are "one" signals on the corresponding conductors of buses 53 and 1123.

(B3.12) Program starting memory

The program starting memory 1104 is shown in FIG. 11. It contains five memory blocks 1104/I to 1104/V. Each of the memory circuits is connected to a corresponding one of the conductors 1122/I to 1122/V of a five-way bus 1122 and to a corresponding one of the conductors 53/I to 53/V of the program bus 53, each circuit also being connected to governing conductors 1137 and 1145. The memory circuits 1104/I to 1104/V are identical and FIG. 11 shows in detail the diagram of the circuit 1104/I only.

The memory circuit 1104/I comprises a delay circuit 11041, an OR-gate 11042, an inverter 11045 and AND-gates 11043, 11044 and 11046. The memory circuit is set to the "one" state ("I" state) by a simultaneous "one" signal at both inputs of the gate 11043. When in the "one" state, the block 1104/I emits a "one" signal via the bus 1121/I of the line 1121. The memory circuit remains in its "one" state until "one" signals are supplied simultaneously at both inputs of the gate 11046.

Thereupon the feedback AND-gate 11044 is closed via the inverter 11045 and the memory is zeroed or reset. The other memory circuits 1104/II to 1104/V operate in an analogous manner. A signal on the governing conductor 1137 sets in the "one" state that memory which is determined by the "one" signal on one of the conductors 1122/I to 1122/V of the bus 1122. A signal on the governing conductor 1145 resets or zeroes that memory block which is determined by the "one" signal on one of the conductors 53/I to 53/V of the program bus 53. The "one" state of the various memory circuits 1104/I to 1104/V is represented by a "one" signal on the corresponding conductors 1121/I to 1121/V of the bus 1121.

(B3.13) Inverters and OR-gates

The inverter 1105 is shown in FIG. 12. It comprises five inverters 1105/I to 1105/V connected to corresponding conductors 1121/I to 1121/V. The outputs of the inverters are connected to conductors 1119/I to 1119/V of the bus 1119. The inverters 1105/I to 1105/V generate at their outputs signals which are the logical inverse of the input signals supplied to them. Thus, a "one" input signal produces corresponds a "zero" output signal of the inverter and vice versa, so that a "zero" input signal produces a "one" output signal of the inverter.

The OR-circuit 1106 is diagram shown in FIG. 13. It contains five OR-gates 1106/I to 1106/V. Connected to the input of each OR-gates 1106/I to 1106/V is a corresponding one of the conductors 1119/I to 1119/V and a corresponding one of the conductors 61/I to 61/V. The outputs of the OR-gates 1106/I to 1106/V are connected to the respective conductors 1124/I to 1124/V of the bus 1124. Each OR-gate 1106/I to 1106/V produces at its output a logical sum of the signals supplied to its inputs. FIG. 13 is an exemplary embodiment of the connection of the output 611/I of the peripheral unit module 4/1 (FIG. 1 or 2) to the program block bus 61. This is effected by the OR-gate 610/1, which is similar in wiring and operation to of the OR-gates 1106/I to 1106/V. Additional peripheral unit modules are connected via similar OR-gates 610/2, 610/3, 610/4, etc.

The inverter 1107 is shown in FIG. 14. It comprises five inverters 1107/I to 1107/V connected between corresponding conductors 1124/I to 1124/V and conductors 1120/I to 1120/V of the bus 1124 and the bus 1120, respectively. The operation of the inverter 1107 is analogous to that of the inverter 1105, shown in FIG. 12.

OR-gate

The OR-gate 1117 is shown in FIG. 15. It comprises an OR-gate 11171, which is connected to conductors 53/I to 53/V of the program bus 53 and to which the conductor 1135 is connected.

(B3.14) Comparator

The comparator 1108 is shown in FIG. 16. It comprises the comparator 11081, to which nine five-way buses 1125, 625, 626, 627, 628, 1122, 53, 1120 and 1123 are connected and to which two governing conductors 1136 and 1148 are connected. Two output governing conductors 1152 and 1153 are connected to the comparator 11081.

Programs with a higher basic priority, such as with a second degree priority, one indicated by a "one" signal on the respective conductor (1125/I to 1125/V) of the five-way bus 1125, which is part of the line 104 from the manual control unit 18 (FIG. 1). Thus, for example, if the programs II, III and V from the manual control unit 18 are noted with a higher basic priority, the "one" signal will be provided on the conductors 1125/II, 1125/III and 1125/V. Programs with a third degree priority are also denoted by signals on the conductors 625. Programs having a fourth degree priority are noted on the conductor 626. Programs with a fifth degree priority are noted on the conductor 627. Programs with a sixth degree priority are noted on the conductor 628. A program is noted on the conductor 1125, in which program an intervention is executed from the manual control unit 18 and which, for the duration of said intervention, has a seventh degree priority.

A signal on the conductor 1136 indicates to the comparator 11081 that an intervention is being executed. A "one" signal on one of the conductors of the program bus 53 indicates the number of the program most recently in effect to the comparator 11081. The "one" signals on the respective conductors of the bus 1120 indicate those programs to the comparator which are started, but which are not blocked by a signal on the program block bus 61 (FIG. 1 or FIG. 13). A signal on one conductor of the bus 1123 indicates to the comparator 11081 which of the five programs can be ranged in the next cycle. The waveforms of pulses on the various conductors 1123/I to 1123/V (FIG. 10) of the bus 1123 are shown in time diagrams in FIG. 17. The abscissa of each diagram represents time, and the divisions or graduations of the uppermost representation denote the cycles.

The waveforms are those of the signal on conductors 1123/I to 1123/V, respectively. As shown in FIG. 17, the waveforms are repeated for a five-cycle period. This period equals the delay in the long delay lines (1407/1 to 1407/5 in FIG. 4 or 1604/1 to 1604/5 in FIG. 5) of the backing registers.

It follows therefrom, that, for example, a certain word inserted into any of the backing registers in the cycle determined by the "one" signal, for example on the conductor 1123/III, may be withdrawn from the backing register in that one of the following cycles, in which a "one" signal is provided again on the same conductor 1123/III. In this manner, the signals on the conductor 1123 cause five words to be firmly assigned in the backing registers of the five programs I to V.

The five-way conductors 625, 626, 627 and 628 are components of the progrram priority bus 62 which is shown in detail in FIGS. 22a, 22b, 22c and 23. Each of said conductors 625 to 628 comprises, for example, five lines, such as 626/I, 626/II, 626/III, 626/IV and 626/V. Along the input connecting channel 6, a part of which is the program priority bus 62, the OR-gates, such as 626/1/I, 626/1/II, 626/1/III, 626/1/IV and 626/1/V, are connected to the conductors 625 to 628 consecutively, as required. By means of said OR-gates the respective output lines, such as 621/1 to 621/8 in FIGS. 22a 22b, 22c and 23, of the auxiliary memory module 3 and of the peripheral unit modules 4/1 and 4/2 are connected.

The logical circuits of the comparator operate as follows:

(a) If no "one" signal is supplied via the bus 1148, the comparator determines during each cycle, which is the highest priority degree indicated by the signals on buses 1125, 625 to 628, 1122 and compares this highest priority with the priority of the program most recently in effect, whose number is indicated by the signal on the program bus 53. If the two aforementioned priority degrees are identical, the comparator emits in the last period of the cycle (indicated $u$) a "one" signal to the conductor 1153. In the opposite case, the comparator 11081 emits in the period "$u$" a "one" signal via the conductor 1152.

(b) If a "one" signal is supplied via the conductor 1148 the comparator 11081 determines during each cycle, which is the highest priority degree indicated by signals on the buses 1125, 626 to 628, 1122 and compares this highest priority with the polarity of that program whose number will, in the following cycle, be indicated by a "one" signal on any of the conductors of the bus 1123. If these two priorities coincide, the comparator 11081 emits, in the period "$u$" of this cycle, a "one" signal to the conductor 1153. In the opposite case, the comparator 11081 emits in the period "$u$" of the same cycle a "one" signal to the conductor 1152.

(B3.15) *Starting circuit*

The starting circuit 1109 is shown in a block diagram in FIG. 18. It comprises a trigger pulse generator 110901, delay circuits 110902 and 110903, inverters 110910 and 110911, OR-gates 110904 and 110905 and AND-gates 110906, 110907, 110908 and 110909. The trigger pulse generator is connected to the buses 1126 and 1127. One of its output conductors 1137 is connected to the OR-gate 110904 and is one of the outputs of the starting circuit 1109. The other output conductor of the trigger pulse generator 110901 is connected to the OR-gate 110905. The delay circuit 110902 with the AND-gate 110906 and the OR-gate 110904, as well as the delay circuit 110903 and the AND-gate 110907, and the OR-gate 110905 constitute the memory circuits 110920 and 110921, which are switched to the "one" state by the respective trigger pulse from the generator 110901 and are set to zero or reset by a pulse on the governing conductor 1133, connected via the inverter 110911 the AND-gates 110906 and 110907.

The AND-gate 110908 is connected to the output conductor 1136 from the delay circuit 110902. The conductivity of the AND-gate 110980 is controlled by the governing conductor 1135 via the inverter 110910 and by the governing conductor 1138. The output of the gate 110908 is the conductor 1138. The AND-gate 110909 is connected to the output of the delay circuit 110902. The conductivity of the AND-gate 110909 is controlled by a signal on the conductor 1133.

The output of the AND-gate 110909 is conductor 1139. The generator 110901, after a pulse on the bus 1126, emits for one period a "one" signal to the conductor 1137 and, via the OR-gate 110904, to the delay circuit 110902. When there is a pulse in the bus 1127, the generator 110901 emits the same signal to the bus 1137 and delay circuit 110902, as well as via the other output conductor via the OR-gate 110905 to the delay circuit 110903.

(B3.16) *Stopping circuit*

A plurality of buses are connected to the stopping circuit 1110 (FIG. 7) for the plurality of signals. Such buses include the bus 1128 from the control unit 12 (FIG. 1) for the transmission of a signal indicating a failure of the machine, the bus 1129 for the transmission of a signal indicating a programming error in the program in effect and the bus 1130 for the transmission of a signal initiating a programmed stoppage of the program in effect. Buses 206 and 103 are connected from the working memory module 2 and the auxiliary memory module 3 for the transmission of signals relating to nonpermissible address in the program in effect and the bus 1139 is connected from the starting circuit 1109 for the transmission of a signal initiating the manual stoppage of the program in effect.

After a signal is supplied via the bus 1128, the stopping circuit 1110 emits a continuous signal "INTERRUPT" via the bus 1141. This signal cannot be terminated except by a manual intervention in the circuits of the system. Upon the supply of any signal via the buses 1129, 1130, 206, 103, 1139 the stopping circuit 110 emits a continuous signal "STOP" via the conductor 1140. The transmission of the "STOP" signal is terminated by a signal on the governing conductor 1142. The stopping circuit 1110 emits a signal indicating to the operator the cause and type of the stoppage to the signalling block 17 (FIG. 1) via the bus 1155.

(B3.17) *Decision gate*

The decision gate 1111 is represented by a block diagram in FIG. 19. It comprises a decision circuit 11111, an OR-gate 11113 and a delay circuit 11112. The input conductor 1131 and a conductor 11116 from the delay circuit 11112 are connected to the inputs of the OR gate 11113. The input the delay circuit 11112 is connected to the output conductor 11115 in the decision circuit 11111. The other input and output conductors of the decision gate 1111 are connected directly to the decision circuit 11111. The delay circuit 11112 operates to delay a signal introduced therein through the bus 11115, for instance in the last period of one cycle in such a way, that it is derived from the conductor 11116 in the last period of the following cycle. The decision circuit 11111 emits a signal "CLEAR" via the bus 1143, a signal "CONTINUE" via the bus 1144, a signal "WAIT" via the bus 11115 and a signal "SET TO ZERO" via the bus 1142.

For the emission of the foregoing signals some of the following conditions are decisive:

(a) Is there a "one" signal on the conductor 1131 (end of operation in the central unit module 1) or 11116, i.e. is this signal on the conductor 1114, (b) Is there a "one" signal on the OMEGA-blocking signal bus 63 (blocking signal from the auxiliary memory module 3 or peripheral unit module 4/1 etc.).

(c) Is there a "one" signal on the conductor 1152 (signal "CLEAR" from the comparator 11081) or on the conductor 1140 (signal "STOP" from the starting circuit 1109).

(d) Is there no "one" signal on any of the conductors 1152, 1140.

(e) Is there a "one" signal on the conductor 1141 (a signal "INTERRUPT" from the stopping circuit 1110).

(f) Is there no "one" signal on the conductor 1141

(g) Is there a "one" signal on the conductor 1132 (signal "POSTPONE CLEARING" from the control unit 12).

(h) Is there no "one" signal on the conductor 1132

(i) Is there a "one" signal on the conductor 1140.

The signal "CLEARING" is emitted by the conductor 1143, if simultaneously, the conditions either (ad a), (c), (f), (h), or the conditions (ad b) and (h) are fulfilled.

The signal "CONTINUE" is transmitted by the conductor 1144, if the conditions (a), (d), (f) are fulfilled simultaneously.

The signal "WAIT" is transmitted over the conductor 11115, if the conditions (a), (c), (f), (g) or the conditions (b), (g) are fulfilled simultaneously.

The signal "SET TO ZERO" is transmitted along the conductor 1142, if the conditions (a), (f), (h), (i) are fulfilled simultaneously.

(B3.18) *Clearing circuit*

The clearing circuit 1112 is shown in FIG. 20. It comprises a delay circuit 11120, an OR-gate 11124, AND-gates 11121, 11122 and 11123 and an inverter 11125. The delay circuit 11120, AND-gate 11121 and the OR-gate 11124 constitutes a memory circuit 11129, which is set to the "one" state by a signal supplied via the conductor 1143. The AND-gate 11122, which is connected to the governing conductor 1134 is connected to the output 11127 of the delay circuit 11120. The output 1147 of the AND-gate 11122 is connected to the AND-gate 11123, which is opened in the last period (u) of each cycle by a signal from the pulse generator 1157. The output 1145 of the AND-gate 11123 is connected to the inverter 11125, which controls the conductivity of the AND-gate 11121 via the conductor 11128.

(B3.19) *Ranging circuit*

The ranging circuit 1114 is shown in FIG. 21. It comprises delay circuit 111401, 111402, OR-circuits 111403, 111404, AND-gates 111405, 111406, 111407 and 111408 and inverters 111409 and 111410. The delay circuit 111401, the AND-gate 111405 and the OR-gate 111403 constitute one memory circuit 111420 and the delay circuit 111402, the AND-gate 111406 and the OR-gate 111404 constitute the other memory circuit 111421.

The input 1152 is connected to the OR-gate 111403 of the first memory circuit 111420. The output of the delay circuit 111401 consists of the conductor 1148, which is connected to the AND-gate 111407 connected to the governing conductor 1153.

The output of the AND-gate 111407 is connected to the OR-gate 111404 of the second memory circuit 111421. The output of the delay circuit 111402 consists of the conductor 1149, which is connected to the inverter 111410 and to the AND-gate 111408. The AND-gate 111408 is opened by a pulse (*rr*) from the pulse generator 1157, which pulse closes the AND-gate 111406 of the second memory circuit feedback via the inverter 111409. The output of the AND-gate 111408 consists of the conductor 1150. The output of the inverter 111410 consists of the conductor 1146, which is connected to the AND-gate 111405 of the feedback of the first memory circuit 111420.

(B3.20) *Operation of the organisation control unit*

The organisation control unit 11, represented by the block diagram of FIGS. 6 and 7, performs the following main operations:

Starting of the first program (first as to time),
Exchange of programs,
Starting of the next program,
Stopping of the program.

(B3.21) *Starting of first program*

Prior to starting the program, the manual control unit 18 (FIG. 1) signals through the bus 1122 the number of the program for instance II which will be started and, if necessary, via the bus 1125 a signal relating to a higher basic priority. Also assigned to this program are the required sections of the working memory module 2 and auxiliary memory module 3, peripheral unit modules (4/1, 4/2 etc.). The initial conditions are supplied to the respective sections of the backing registers 151 and 161 (FIG. 1a), in particular the first instruction to the respective locations on the lines 1604/1 to 1604/5 (FIG. 5). A signal on the bus 1126 then excites the trigger pulse generator 110901 (FIG. 18), which by means of a pulse on the conductor 1137 causes the circuit 1104/11 of the program starting memory 1104 (FIG. 11) to be set to the "one" state, said circuit having been determined by the simultaneous "one" signal on the conductor 1122/II of the bus 1122. The same pulse on the conductor 1137 sets the delay circuit 110902 (FIG. 18) to the "one" state. The delay circuit 110902 causes the started program II to receive in the comparator 1108 (FIG. 16) the highest, seventh priority degree by a signal via the conductor 1136.

The signal from the delay circuit 110902 (FIG. 18) is supplied to the AND-gate 110908. The "one" signals from the inverter 110910 are supplied to the inputs of the AND-gate 110908. The zero signal on the conductor 1135 indicates that no program is yet effective. The "one" signals are supplied via the conductor 1146 from the inverter 111410 (FIG. 21).

The AND-gate 110908 is thus conductive and the signal is supplied via the conductor 1138, OR-gate 1113 and conductor 1152 to the ranging circuit 1114 (FIG. 21), where it initiates the delay circuit 111401 to a "one" state. In this way, the emission of a "one" signal via the conductor 1148 to the comparator 11081 (FIG. 16) is started, and the emission of a "one" signal via the conductor 1153 to the ranging circuit 1114 is initiated in the last period (*u*) of the cycle. A cycle follows thereafter in which from the long lines 1407/1 to 1407/5 or 1604/1 to 1604/5 of the backing registers (FIGS. 4 and 5) the words (numbers and instructions) which belong to the program 11 to be started are provided.

The AND-gate 111407 (FIG. 21) is opened by a signal on the conductor 1153 with the result that the delay circuit 111402 is set into the "one" state for the period of one cycle. The "one" signal on the output conductor 1149 initiates the transmission of the respective words from the backing registers to the arithmetic register 14, auxiliary register 15 and control register 16 (FIGS. 1a or 4 and 5). The same signal causes the delay circuit 111401 (FIG. 21) to be set to zero via the inverter 111410 and the gate 110908 (FIG. 18) is closed via the conductor 1146 whereby the signal on the conductor 1138 is terminated.

The gate 11013 in the memory circuit 1101/II in the program in effect memory 1101 (FIG. 8) is opened by a signal on the conductor 1149, because at the same time a "one" signal is provided via the conductor 1123/II, with the result that the memory circuit 1101/II is set to the "one" state.

As soon as the number of the selected program, as signalled via the conductor 1122, coincides in the coincidence circuit 1102 (FIG. 9) with the number of the program on the program bus 53, a signal is transmitted along the conductor 1133 to the starting circuit 1109 (FIG. 18), so that the delay circuits 110902 or 110903 are set to the zero state. At the end of the same period, prior to setting the delay circuit 111402 (FIG. 21) to zero by a pulse from the generator 1153, the AND-gate 111408 is opened and the "one" signal transmitted via the conductor 1150 and the OR-gate 1115 (FIG. 7) to the output gate 1116. According to the type of instruction which is present at this moment in the control register 16 (FIG. 1), connected by the bus 110 to the output gate 1116, the signal emerges from the output gate 1116 either via the OMEGA-signal bus 54 to the auxiliary memory module 3 and peripheral unit modules 4/1, 4/2 etc. (FIG. 2), or via the bus 102 to the auxiliary memory module 3 or, finally, via the bus 106 to the control unit 12, where it initiates the execution of the operation in the central unit module 1. After the operation in the central module 1 has been effected, including an exchange of instructions in the control register, the "one" signal is supplied at the end of the cycle, via the conductor 1131 to the decision gate 1111 (FIG. 7) and, if the respective conditions are fulfilled, it is supplied via the conductor 1144 and the OR-gate 1115 to the output gate 1116 and the further procedure is a repetition of the operation just described.

(B3.22) *Exchange of programs*

The organisation control unit 11 effects this operative step, if, in the cycle at the end of which a signal relating to the termination of the operation is supplied from the control unit 12 via the bus 1131 to the decision gate 1111, the comparator 1108 signals by a signal "WITHDRAW" on the conductor 1152, that another program, such as program V, has a higher priority degree than the most recent program, such as II, and, if there is no signal "POSTPONE WITHDRAWAL" on the conductor 1132 of the bus 107 leading from the control unit 12.

The decision gate 1111 prevents the transmission of the signal via the conductor 1144 and, instead, a signal is transmitted via the conductor 1143 to the clearing circuit 1112 (FIG. 20), where it sets the delay circuit 11120 to the "ONE" state via the OR-gate 11124.

In the next cycle, when a signal is supplied via the conductor 1134 from the coincidence circuit 1103 (FIG. 10), indicating that the number of the program in effect on the program bus 53 coincides with the number of the program, which in this cycle may be stored in the backing register 141, 151, 161 (FIG. 1), the AND-gate 11122 (FIG. 20) is opened and, by a "one" signal on the conductor 1147, the corresponding gates in the registers containing a backing register (FIGS. 4 and 5) are opened for a period of one cycle and the contents of the arithmetic, auxiliary and control registers, which are related to the instantaneous state of the program II to be stored, are transferred to the backing registers. In the last period (rr) of this cycle, the AND-gate 11123 (FIG. 20) is opened, allowing thereby the "one" signal to be supplied to the output conductor 1145, said signal setting the delay circuit 11120 to zero, due to AND-gate 11121 having been closed via the inverter 11125. The "one" signal sets the program in effect memory (FIG. 8) to zero and excites the delay circuit 111403 of the ranging circuit 1114 (FIG. 21) via the OR-gate 1113 and conductor 1152. From that instant, the further operation is identical with the operation when the same delay circuit is excited in the course of starting the first program, which operation has hereinbefore been described in detail.

The withdrawal of the program occurs in a similar way, if a signal on the OMEGA-blocking signal bus 63 indicates to the decision gate 1111 from any peripheral unit module, that the program in effect is blocked.

(B3.22) *Starting of further programs*

The further program, for example IV, is started in a manner similar to the first one, in the manner described in section B3.20. Since, however, another program (for example II) is simultaneously in effect, the signal, after excitation of the delay circuit 110902 (FIG. 18), is not transmitted via the AND gate 110908 to the output conductor 1138, because due to the inversion of the "one" signal on the conductor 1135, the AND gate 110908 is closed. Owing to the high priority degree of the program IV which is to be started, the comparator first initiates the withdrawal of the running program II in effect in a manner described in section B3.21 and then initiates the ranging of the program IV. After the program IV has been ranged, the delay circuit 110902 (FIG. 18) is set to zero by a signal from the coincidence circuit 1102, a manner analogous to that during starting of the first program, as described in section B3.20.

(B3.23) *Stopping of program*

The stopping of the program is effected either by interruption or stoppage. An interruption is substantially a breakdown condition, to which the stopping circuit 1110 (FIGS. 6 and 7) responds by a signal on the conductor 1141. After said signal is supplied thereto, the decision gate 1111 does not allow the machine to continue its operation, since it prevents the signal from being transmitted via any of the conductors 1142, 1143 and 1144. Further operation of the machine is possible only after the fault has been removed.

The stopping of the program in effect (for instance program IV) is initiated by the stopping circuit, by means of a signal on the conductor 1140. After the signal is supplied via the conductor 1131, the output signal is transmitted from the decision gate 1111 to the conductor 1142, which initiates the zeroing or resetting of the memory circuit 1104/IV (FIG. 11) in the program starting memory 1104 and further terminates the emission of the "STOP" signal on the conductor 1131 from the stopping circuit 1110. A signal transmitted to the clearing circuit 1112 initiates further operation, which is identical with that described in section B3.21.

The stoppage of a program (for instance program I) which though started is not proceeding, is initiated from the manual control unit 18 (FIG. 1) by a signal via the conductor 1127 to the starting circuit 1109 (FIG. 18). As a result thereof the trigger pulse generator transmits a pulse on the one hand to the conductor 1137 and thereby to the delay circuit 110902, and on the other hand it sets to a "one" state the delay circuit 110903. A signal on the conductor 1137 initiates the program I to be ranged by a procedure described in section B3.22.

At the moment that the program I is ranged, and by a signal on the conductor 1133, the delay circuits 110902 and 110903 (FIG. 18) are set to zero, the same signal opens the AND gate 110909 and a pulse is transmitted through the conductor 1139 to the stopping circuit 1110. After effecting one operation of program I, the circuit 1110 initiates in the above described manner (by a signal on the conductor 1140) the stoppage of program I, including zeroing or resetting of the circuit 1104/I of the program starting memory 1104.

What we claim is:

1. A modular data processing system for the simultaneous solution of a plurality of problems on instruction in accordance with a plurality of independent programs, said data processing system comprising central means including organization control means;
   working memory means;
   auxiliary memory means;
   peripheral means, each of said auxiliary memory means and said perpiheral means including a discriminating circuit;
   output connecting channel means connecting said central means in common to said auxiliary memory means and said peripheral means, said output connecting channel means including a program line connected between the organization control means of said central means and the discriminating circuit of each of said auxiliary memory means and each of said peripheral means for transmitting to each of said discriminating circuits a signal indicating to which of the plurality of independent programs a selected instruction relates; and
   input connecting channel means connecting said auxiliary memory means and said peripheral means in common to said central means.

2. A modular data processing system as claimed in claim 1, wherein said central means includes a control register, wherein said output connecting channel means includes an address line connected between the control register of said central means and the discriminating circuit of each of said auxiliary memory means and each of said peripheral means for transmitting to each of said discriminating circuits the address part of the selected instruction from said control register, and wherein said working memory means includes an address switch connected to said address line and to said program line for providing an effective address from an address indicated by a signal in said address line and a manual switching unit connected to said address switch for transmitting to said address switch a separate command for each of the plurality of independent programs to provide said effective address, the command of said manual switching unit being determined by a signal in said program line during the operation of said address switch.

3. A modular data processing system as claimed in claim 1, wherein said central means includes arithmetic register means, auxiliary register means and control register means each having backing register means having memory sections reserved for each of said plurality of independent programs, each of said backing register means being connected to the organization control means of said central means for said organization control means to initiate the transfer of the contents of said arithmetic, auxiliary and control register means to reserved memory sections of the corresponding backing register means thereof and to initiate the transfer of the contents of the reserved memory sections of said backing register means to said arithmetic, auxiliary and control register means.

4. A modular data processing system as claimed in claim 1, wherein said output connecting channel means includes an omega signal line connected between the organization control means of said central means and the discriminating circuit of each of said auxiliary memory means and each of said peripheral means for transmitting to each of said discriminating circuits an omega signal when one of the auxiliary memory means and the peripheral means is to be actuated and wherein said input connecting channel means includes a program block line, a program priority line and an omega blocking signal line for transmitting to said central means an omega blocking signal when said one of said auxiliary memory means and said peripheral means is unable to perform a specified operation, each of said program block line, said program priority line and said omega blocking signal line being connected between each of said auxiliary memory means and each of said peripheral means and the organization control means of said central means.

5. A modular data processing system as claimed in claim 1, wherein said peripheral means includes peripheral memory means, peripheral control means and a discriminating circuit connected to said peripheral memory means via said peripheral control means, said discriminating circuit comprising an initiating circuit, a blocking gate, a selector circuit connected to said peripheral control means via said blocking gate and said initiating circuit, a program block memory connected to said blocking gate and said peripheral control means and a program number selector connected to said selector circuit, said program block memory and said peripheral control means.

6. A modular data processing system as claimed in claim 1, wherein said auxiliary memory means includes an auxiliary memory unit, control means and a discriminating circuit connected to said auxiliary memory unit via said control means, said discriminating circuit including an initiating decsion circuit, a blockng gate, a selector circuit connected to said initiating decision circuit via said blocking gate, an allotting circuit connected to said control means, a program number memory connected to said control means and to said allotting circuit, a program block memory connected to said program number memory and to said control means and a priority signal emitter connected to said control means, said blocking gate, said program block memory and said program number memory.

7. A modular data processing system as claimed in claim 1, wherein said output connecting channel means includes a plurality of synchronizing lines connected to each of said auxiliary memory means and each of said peripheral means wherein said program line comprises a plurality of conductors and wherein the organization control means of said central means includes a program in effect memory and said program in effect memory includes a plurality of memory circuits each corresponding to a different one of said plurality of programs and each connected to a corresponding one of said synchronizing lines, each of said memory circuits having a set and a reset condition, an output and a gate connected between the memory circuit and the corresponding synchronizing line, the outputs of said memory circuits being connected to corresponding conductors of said program line, a single control line connected to the gate of each of said memory circuits for controlling each said gate and a single reset line connected to each of said memory circuits for controlling the reset condition thereof whereby a signal in said single control line at a determined time switches one of said memory circuit to its set condition, said one of said memory circuits being selected by a signal in said synchronizing line, the signal in the corresponding conductor of said program line having a duration which extends until said one of said memory circuits is switched to its reset condition by a signal in said reset line.

8. A modular data processing system as claimed in claim 1, wherein each of said auxiliary memory means and each of said peripheral means includes output means and said input connecting channel means includes a plurality of lines and further comprising a plurality of OR-gates connected between each of the lines of said input connecting channel means and the corresponding output means of each of said auxiliary memory means and peripheral means whereby signals transmitted to said central means via said input connecting channel means are logical sums of signals from the individual auxiliary memory means and peripheral means.

9. A modular data processing system as claimed in claim 1, wherein said central means includes manual control means connected to said organization control means and wherein said organization control means includes a memory having an output, an input connected to said program line and another input connected to the manual control means of said central means via a determined line, said determined line transmitting to said memory a signal indicating which of said plurality of programs is selected for intervention and said memory providing in its output a predetermined set signal only when the program indicated by a signal in said determined line from said manual control means is the same as the program indicated by a signal in said program line.

10. A modular data processing system as claimed in claim 1, wherein the organization control means of said central means includes a comparator connected to said program line, said comparator having an output and a plurality of inputs, one of said inputs transmitting to said comparator information concerning the zero priority degree of the programs of said plurality of programs and a number of said inputs transmitting to said comparator information concerning the priority degree of a corresponding one of said programs, said comparator providing a signal in its output when any program of said plurality of programs other than that indicated by the signal in said program line has a priority degree higher than a program with a non-zero priority.

11. A modular data processing system as claimed in claim 2, wherein said manual switching unit provides different reference indications for each of said plurality of independent programs in accordance with a signal in said program line and wherein said address switch is connected to the organization control means of said central means for transmitting to said organization control means an indication of any deviation of the address in said address line from the reference indications provided by said manual switching unit.

12. A modular data processing system as claimed in claim 3, wherein said output connecting channel means includes a plurality of synchronizing lines connected to each of said auxiliary memory means and each of said peripheral means and wherein each of said arithmetic and control register means includes a plurality of long delay lines and input means connected to each of said long delay lines and output means connected to each of said long delay lines for supplying to and removing from said long delay lines the contents of said memory sections in accordance with the individual programs and in synchronism with pulses in said synchronizing lines whereby each memory section is selected by a signal in a corresponding one of said synchronizing lines, said signal initiating a shift of contents between said register means and said auxiliary memory means.

13. A modular data processing system as claimed in claim 5, wherein said discriminating circuit includes a unit number selector connected to said selector circuit for providing unit numbers and said selector circuit initiates operation of said peripheral means only if a unit number provided by said unit number coincides with a unit number indicated by signal in said address line.

14. A modular data processing system as claimed in claim 5, wherein said input connecting channel means includes a program block line connected between each of said auxiliary memory means and each of said peripheral means and the organization control means of said central means, wherein said program number selector determines a program of said plurality of independent programs and wherein the program block memory of said discriminating circuit is connected to said program block line, to said program number selector and to said peripheral control means for transmitting to said program block line a blocking signal for blocking the program determined by said program number selector, said blocking gate providing a signal and said peripheral control means providing a signal determining the termination of said blocking signal.

15. A modular data processing system as claimed in claim 5, wherein said input connecting channel means includes a program priority line connected between each of said auxiliary memory means and each of said peripheral means and the organization control means of said central means, wherein said program selector determines a program of said plurality of independent programs and wherein said peripheral control means is connected to said program number selector and to said program priority line for transmitting to said program priority line a signal indicating a priority degree for the program determined by said program number selector, said priority degree being determined by said peripheral means and the duration of said signal indicating a priority degree being determined by the ability of said peripheral means to perform a specified operation.

16. A modular data processing system as claimed in claim 5, wherein said output connecting channel means includes a synchronizing line connected to each of said auxiliary memory means and each of said peripheral means and wherein said peripheral memory means includes input buffer memory means connected to said synchronizing line.

17. A modular data processing system as claimed in claim 6, wherein said output connecting channel means includes a data output line connected to each of said auxiliary memory means and each of said peripheral means and said input connecting channel means includes an omega return signal line for transmitting to said central means an omega return signal when said one of said auxiliary memory means and said peripheral means is able to perform a specified operation, an omega blocking signal when said one of said auxiliary memory means and said peripheral means is unable to perform a specified operation and a program block line, each of said omega return signal line, said omega blocking signal line and said program block line being connected between each of said auxiliary memory means and each of said peripheral means and the organization control means of said central means and wherein said discriminating circuit includes OR-gate means and said allotting circuit is connected via said OR-gate means to said omega return signal line and is connected to said organization control means, said allotting circuit providing substantially two types of intervention in dependence upon the contents of said program number memory upon the supply thereto of a pulse from said organization control means whereby where there are no contents in said program number memory said allotting circuit initiates in said program number memory a storage of the program number indicated by a signal in said data output line and transmits a signal to said omega return signal line to initiate in said auxiliary memory unit the intervention specified by said organization control means and when the number of a program is stored in said program number memory said allotting circuit transmits a signal to said omega blocking signal line and transmits a signal to said program block memory to initiate the storage of the program number indicated by a signal in said program line and also transmits a blocking signal to said program block line to block the program indicated by the number stored in said program block memory.

18. A modular data processing system as claimed in claim 6, wherein said output connecting channel means includes an address line connected to each of said auxiliary memory means and each of said peripheral means and wherein said auxiliary memory means includes an address switch governing unit and an address switch connected to said address switch governing unit and to said auxiliary memory unit, said address switch having inputs connected to said address line and to said program line and an output connected to said auxiliary memory unit, said address switch providing from an address determined by a signal in said address line an effective address in accordance with a command supplied to said address switch from said address switch governing unit, said command being different for each of said plurality of programs and the signal in said program line determining the selection of said command during operation of said address switch.

19. A modular data processing system as claimed in claim 10, wherein said input connecting channel means includes a program priority line connected between each of said auxiliary memory means and each of said peripheral means and the comparator of said organization control means, said program priority line comprising a plurality of conductors each of which corresponds to a different priority degree of said plurality of programs and the total number of which is the same as the number of priority degrees of said programs, each of said conductors of said program priority line transmitting to said comparator a signal indicating a priority degree corresponding thereto.

20. A modular data processing system as claimed in claim 17, wherein said blocking gate is connected to said program line and to said program number memory and wherein upon a comparison between the program number indicating signal in said program line and the program number stored in said program number memory said selector circuit transmits a pulse to said blocking gate and to said initiating decision circuit and upon a lack of comparison of said signal and said program number said selector circuit transmits a signal via said blocking gate and said OR-gate means to said omega blocking signal line and transmits a signal to said program block memory to initiate the storage of the program number indicated by the signal in said program line.

21. A modular data processing system as claimed in claim 19, wherein each conductor of said program priority line comprises a plurality of leads equal in number to the number of programs of said plurality of programs, each of said leads being connected to said comparator from a corresponding one of said auxiliary memory means and said peripheral means, and further comprising a plurality of OR-gates each interposed and connected in corresponding one of said plurality of leads of each conductor of said program priority line.

22. A modular data processing system as claimed in claim 20, wherein said program block memory has inputs and an output and said program number memory has an output connected to an input of said program block memory, an input of said program block memory being connected to said program line, the output of said program block memory being connected to said program block line and wherein said program block memory has a plurality of control inputs, a first of said control inputs being connected to said OR-gate means for initiating the storage of the program number indicated by the signal in said program line, a second of said control inputs being connected to said control means for completely clearing said program block memory and a third of said control inputs being connected to said control means for initiating the clearing of the program number determined by said program number memory and permanently signalling to said program block line all program numbers stored in said program block memory.

23. A modular data processing system as claimed in claim 21, wherein said auxiliary memory means and said peripheral means are divided into groups and all of the auxiliary memory means and peripheral means of each of said groups is connected to a corresponding one of the conductors of said priority line whereby each of said groups is allotted a determined priority degree.

References Cited

UNITED STATES PATENTS

| | | | |
|---|---|---|---|
| 3,200,380 | 8/1965 | MacDonald | 340—172.5 |
| 3,208,048 | 9/1965 | Kilburn | 340—172.5 |
| 3,029,414 | 4/1964 | Schrimpf | 340—172.5 |
| 3,266,023 | 8/1966 | Werme | 340—172.5 |
| 3,229,260 | 1/1966 | Falkoff | 340—172.5 |
| 3,284,776 | 11/1966 | Freedman | 340—172.5 |
| 3,297,999 | 1/1967 | Shimabukuro | 340—172.5 |
| 3,317,898 | 5/1967 | Hellerman | 340—172.5 |

PAUL J. HENON, *Primary Examiner.*

JOHN P. VANDENBURG, *Assistant Examiner.*